(12) United States Patent  (10) Patent No.: US 9,106,859 B2
Kizuna et al.  (45) Date of Patent: Aug. 11, 2015

(54) SOLID-STATE IMAGE PICKUP DEVICE WITH PLURALITY OF CONVERTERS

(71) Applicant: Renesas Electronics Corporation, Kawasaki-shi, Kanagawa (JP)

(72) Inventors: Shunsuke Kizuna, Kawasaki (JP); Katsumi Dosaka, Kawasaki (JP); Hiroto Utsunomiya, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 251 days.

(21) Appl. No.: 13/661,724

(22) Filed: Oct. 26, 2012

(65) Prior Publication Data

US 2013/0112852 A1    May 9, 2013

(30) Foreign Application Priority Data

Nov. 4, 2011   (JP) .................................. 2011-242099

(51) Int. Cl.
*H04N 3/14* (2006.01)
*H04N 5/335* (2011.01)
*H04N 5/378* (2011.01)

(52) U.S. Cl.
CPC .................................... *H04N 5/378* (2013.01)

(58) Field of Classification Search
CPC ........ H04N 5/335; H04N 5/578; H04N 3/155
USPC ................................ 250/208.1; 348/294–324
See application file for complete search history.

(56) References Cited

U.S. PATENT DOCUMENTS

2010/0231768 A1*  9/2010  Utsunomiya et al. ......... 348/302

FOREIGN PATENT DOCUMENTS

JP    2011-066773 A   3/2011
JP    2011-114785 A   6/2011

* cited by examiner

*Primary Examiner* — Renee D Chavez
(74) *Attorney, Agent, or Firm* — Foley & Lardner LLP

(57) ABSTRACT

A solid-state image pickup device includes a column ADC realizing higher precision and higher-speed conversion. Converters converts a signal of each pixels output via a corresponding vertical read line to a digital value by sequentially executing first to N-th (N: integer of three or larger) conversion stages. In the first to (N−1)th conversion stages, each converter determines a value of upper bits including the most significant bit of a digital value by comparing the voltage at a retention stage with a reference voltage while changing the voltage at a retention node. In the N-th conversion stage, each converter determines a value of remaining bits to the least significant bit by comparing the voltage at the retention node with the reference voltage while continuously changing the voltage at the retention node in a range of the voltage step in the (N−1)th conversion stage or a range exceeding the range.

6 Claims, 24 Drawing Sheets

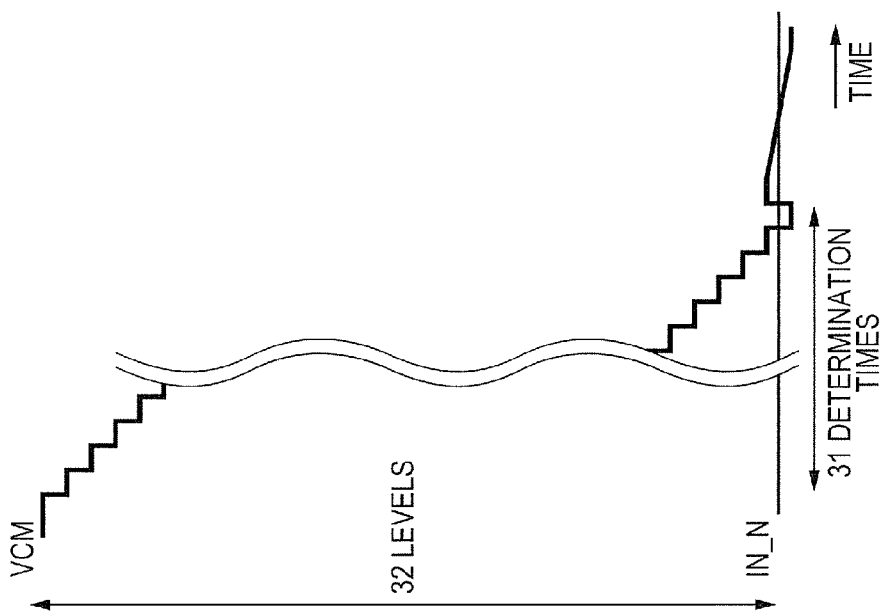
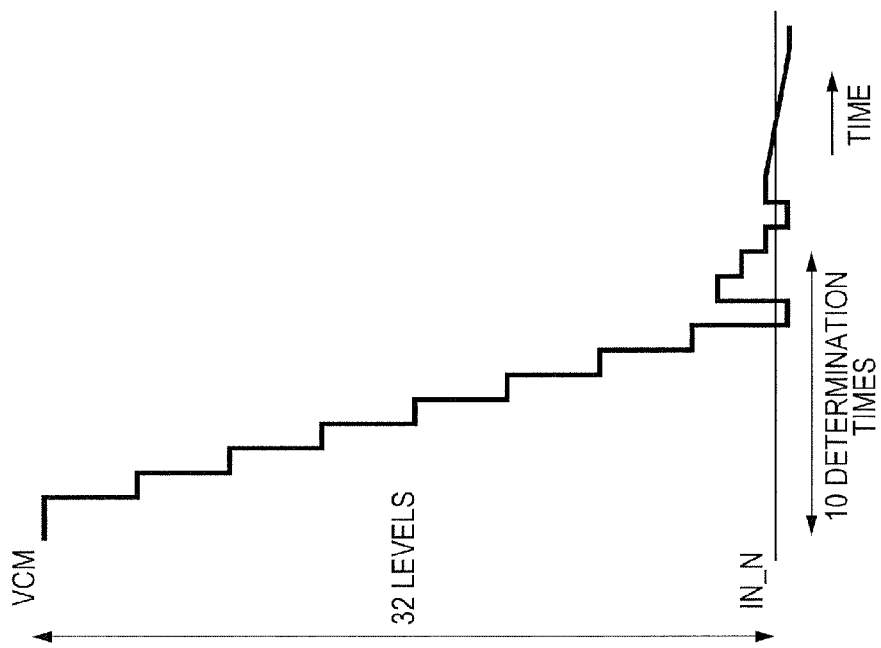

SOLID-STATE IMAGE PICKUP DEVICE WITH PLURALITY OF CONVERTERS

CROSS-REFERENCE TO RELATED APPLICATIONS

The disclosure of Japanese Patent Application No. 2011-242099 filed on Nov. 4, 2011 including the specification, drawings and abstract is incorporated herein by reference in its entirety.

BACKGROUND

The present invention relates to a solid-state image pickup device having therein an analog/digital converter (ADC).

In recent years, a CMOS (Complementary Metal Oxide Semiconductor) image sensor having therein an ADC is actively being developed. The biggest problem of the CMOS image sensor is that, since all of information of pixels is converted to digital values, the data process amount is very large. It is unrealistic to process data by a single ADC, usually column ADCs are provided in correspondence with vertical read lines of columns, and a signal of a pixel of a selected row is AD converted by a corresponding column ADC.

The performances required by such a column ADC are higher precision and higher-speed operation. For example, Japanese Unexamined Patent Application Publication No. 2011-114785 (patent literature 1) discloses a method of satisfying both precision and conversion speed by combining low-precision high-speed AD conversion (coarse conversion) and high-precision low-speed AD conversion (fine conversion). It is also described that, to assure continuity of input/output characteristics in an input voltage range as a determination border (subrange border) of the coarse conversion, a redundant bit is provided in the fine conversion.

Patent Literature 1: Japanese Unexamined Patent Application Publication No. 2011-114785

SUMMARY

In the above-described related-art technique, a method of satisfying both precision and conversion speed is used by combining two kinds of AD conversions. In the method, however, in the case where time required to determine one bit of the high-precision low-speed AD conversion (fine conversion) cannot be shortened, the number of determination times for the low-precision high-speed AD conversion (coarse conversion) doubles each time the resolution increases by one bit. Consequently, there is limitation to satisfy both high precision and high-speed operation.

Therefore, a main object of the present invention is to provide a solid-state image pickup device having therein a column ADC realizing higher-precision and higher-speed conversion.

A solid-state image pickup device according to an embodiment of the present invention has an imaging unit and a plurality of converters. In the imaging unit, a plurality of pixels each including a photoelectric conversion element for converting a light signal to an electric signal are disposed in a matrix, and signals of pixels in a selected row are output via a plurality of vertical read lines disposed for columns while sequentially scanning the pixels row by row. The plurality of converters are provided in correspondence with the plurality of vertical read lines. Each of the plurality of converters has a retention node for retaining a signal of a pixel which is output via a corresponding vertical read line and converts the signal retained by the retention node to a digital value by sequentially executing first to N-th (N: integer of three or larger) conversion stages. In the first conversion stage, each of the converters determines a value of one or plural upper bits including the most significant bit of the digital value by comparing the voltage at the retention node with a reference voltage while changing the voltage at the retention node by a predetermined voltage step. In the i-th conversion stage ($2 \le i \le N-1$), each of the converters determines a value of one or plural bits subsequent to the bit determined in the (i−1)th stage by comparing the voltage at the retention node with the reference voltage while changing the voltage at the retention node by a voltage step smaller than the voltage step in the (i−1)th conversion stage. In the N-th conversion stage, each of the converters determines a value of bits subsequent to the bit determined in the (N−1)th conversion stage to the least significant bit by comparing the voltage at the retention node with the reference voltage while continuously changing the voltage at the retention node in a range of the voltage step in the (N−1)th conversion stage or a range obtained by adding an overrange to the range.

According to the embodiment, by providing N−1 (N≥3) high-speed conversion stage by applying weight to the related-art low-precision high-speed conversion (coarse conversion), higher-precision and higher-speed AD conversion can be performed.

BRIEF DESCRIPTION OF THE DRAWINGS

FIGS. 11A and 11B are comparative diagrams showing AD converting operation of the column ADC 12 of FIG. 9 and AD converting operation of the column ADC 912 of FIG. 10.

DETAILED DESCRIPTION

Figure 1:
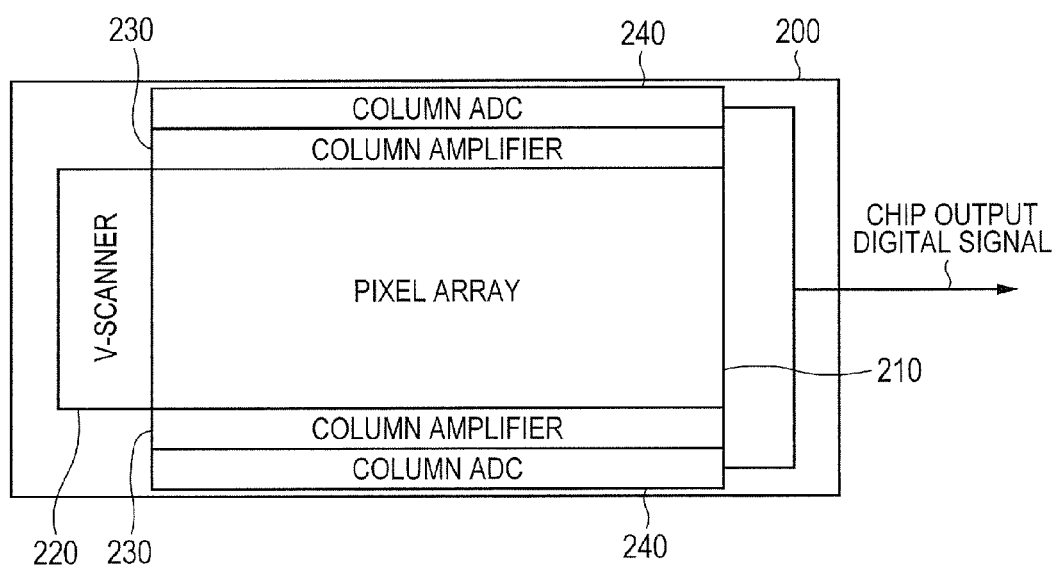
FIG. 1 is a diagram showing a schematic configuration example of a CMOS image sensor.

Hereinafter, embodiments of the present invention will be described in detail with reference to the drawings. The same reference numerals are designated to the same or corresponding parts and their description will not be repeated.

Description of Technique as Precondition of the Present Invention

Prior to description of the details of a solid-state image pickup device in an embodiment of the present invention, the technique as a precondition will be described.

CMOS Image Sensor

FIG. 1 is a diagram showing a schematic configuration example of a CMOS image sensor.

Referring to FIG. 1, a CMOS image sensor 200 is a digital image sensor and includes a pixel array 210, a V-scanner (vertical scanner) for scanning pixels in the vertical direction, column amplifiers 230 disposed for respective columns, and column ADCs 240 for converting analog signals output from the column amplifiers 230 to digital signals.

The column amplifier 230 amplifies pixel signals sequentially transmitted by scanning of the V-scanner 220 and outputs the amplified signals to the column ADC 240. The column ADC 240 converts the analog signal output from the column amplifier 230 to a digital signal and outputs the digital signal to the outside of the chip.

Such a digital image sensor has advantages such that the speed is high because of digital transfer and a data output I/F (interface) such as an existing LVDS (Low Voltage Differential Signaling) can be used. Since the column ADC 240 is directly coupled to the column amplifier 230, the sensor also has advantages of low noise and high-precision designing. For example, an analog image sensor has 12-bit precision (250 μV) whereas the digital image sensor has 14-bit precision (60 μV). On the other hand, the digital image sensor has a drawback of characteristic variations in the column ADCs.

Layout Example of CMOS Image Sensor

Figure 2:
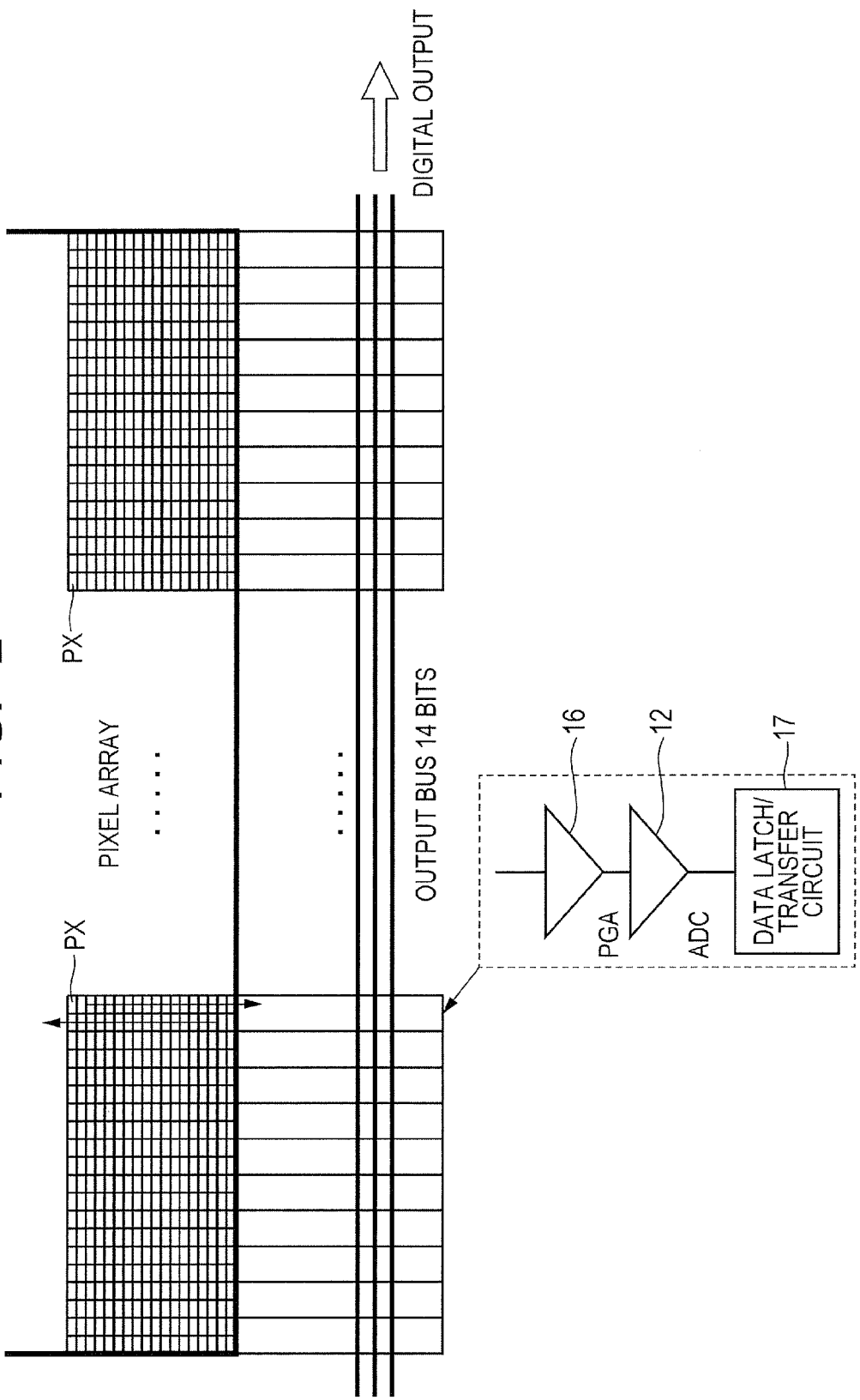
FIG. 2 is a diagram showing a layout example of main parts of the CMOS image sensor.

FIG. 2 is a diagram showing a layout example of main parts of the CMOS image sensor.

Referring to FIG. 2, the CMOS image sensor includes a pixel array 11, a column ADC 12 and a PGA (Programmable Gain Amplifier) 16 disposed for each of columns of pixels, and a data latch/transfer circuit 17.

The PGA 16 (corresponding to the column amplifier 230 in FIG. 1) amplifies a pixel output sequentially sent from pixels PX in the column direction and outputs the amplified output to the ADC 12.

The ADC 12 (corresponding to the column ADC 240 in FIG. 1) converts the analog signal received from the PGA 16 to a digital signal and outputs it to the data latch/transfer circuit 17.

The data latch/transfer circuit 17 (not shown in FIG. 1) sequentially shifts digital values of the pixel outputs in the row direction and outputs the digital signals of the pixels of one row to the outside.

The PGAs 16 and the column ADCs 12 are disposed in the upper and lower sides of the pixel array 11 and one PGA 16 and the column ADC 12 are disposed in the width of the pixels in two columns. Since the width of the column ADC 12 and the PGA 16 is twice the size of the pixel pitch as described above, the shape is very long and thin. Since the column ADC 12 has to be designed under the restriction, a simple circuit configuration with small area is obtained and power saving is necessary.

Pixel of CMOS Image Sensor

Figure 3:
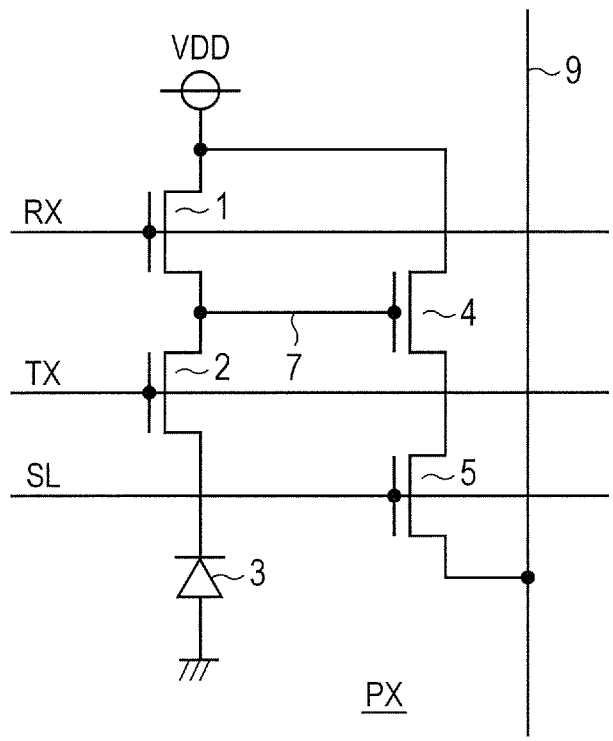
FIG. 3 is a diagram showing an electric equivalent circuit of a pixel PX illustrated in FIG. 2.

FIG. 3 is a diagram showing an electric equivalent circuit the pixel PX illustrated in FIG. 2.

The pixel PX includes a photodiode 3 which converts a light signal to an electric signal, a transfer transistor 2 for transmitting the electric signal generated by the photodiode 3 in accordance with a transfer control signal TX on a transfer control line, and a reset transistor 1 which resets a floating diffusion 7 to a predetermined voltage level in accordance with a reset control signal RX on a reset control line.

The pixel PX also includes a source follower transistor 4 transmitting power supply voltage VDD on a power supply node in a source follower mode in accordance with a signal potential on the floating diffusion 7, and a row selection transistor 5 sending the signal transmitted by the source follower transistor 4 onto a vertical read line 9 in accordance with a row selection signal SL on the row selection line. The transistors 1, 2, 4, and 5 are, as an example, N-channel MOS (Metal Oxide Semiconductor) transistors. Therefore, the pixel PX is a pixel of a CMOS (Complementary MOS) image sensor.

Pixel Reading Operation

Figure 4:
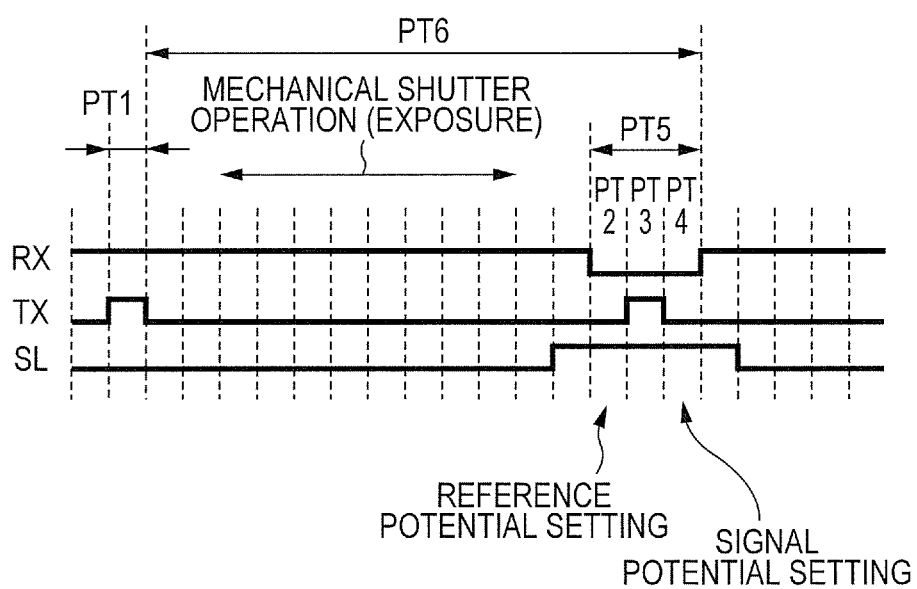
FIG. 4 is a timing chart for explaining the operation at the time of signal reading of the pixel PX shown in FIG. 3.

FIG. 4 is a timing chart for explaining the operation at the time of signal reading of the pixel PX shown in FIG. 3. Referring to FIG. 4, the signal reading operation of the pixel PX shown in FIG. 3 will be described.

In a period PT1, in a state where the reset control signal RX is at the high level (hereinbelow, described as H level), the transfer control signal TX is set to the H level. Both of the reset transistor 1 and the transfer transistor 2 are turned on, and the electric signal converted by the photodiode 3 is initialized. That is, from the photodiode 3, charges accumulated by photoelectric conversion in the preceding cycle are released.

When the transfer control signal TX becomes the low level (hereinbelow, described as L level) and the transfer transistor 2 is turned off, the photoelectric converting operation in the photodiode 3 is performed again, and the signal charges are accumulated. In this state, the reset control signal RX maintains the H level, and the reset transistor 1 maintains the on state. When the reset control signal RX is at the power supply voltage VDD level, the floating diffusion 7 is maintained at a voltage level lower than the power supply voltage VDD by the amount of the threshold voltage of the reset transistor 1.

First, the row selection signal SL becomes the H level, the row selection transistor 5 is made conductive and, by source following operation of the source follower transistor 4, a potential signal according to the potential on the floating diffusion 7 is transmitted onto a vertical read line 9. After that, a pixel reading period PT5 starts.

In the pixel reading period PT5, first, in a period PT2, the reset control signal RX becomes the L level, and the reset transistor 1 is turned off. The signal according to the potential on the floating diffusion 7 is transmitted onto the vertical read line 9 and a capacitive element for reference included in a not shown read circuit is charged. In the period PT2, reference potential of the signal of the pixel PX is set. It corresponds to sampling of information of a dark state of a pixel which will be described later (also called "dark voltage").

In a period PT3, the transfer control signal TX becomes the H level, the transfer transistor 2 is made conductive, and the charges obtained by photoelectric conversion by the photodiode 3 and accumulated are transmitted to the floating diffusion 7. Accordingly, the potential on the vertical read line 9 changes to the potential according to the charges from the pixel. When the transfer control signal TX becomes the L level, according to the potential on the vertical read line 9, a signal charge accumulating capacitive element included in the not-shown read circuit is charged in a period PT4. It corresponds to sampling of information of a light state of a pixel which will be described later (also called "signal voltage").

The reference potential and the signal potential read in the periods PT2 and PT4 are differential-amplified and the signal of the pixel PX (pixel signal) is read.

Sampling is performed twice per pixel and the initial potential and the signal potential are compared, thereby performing a so-called correlated double sampling operation to cancel off the influence of noise in the pixel PX, and an electric signal generated by the photodiode 3 is read.

When reading of the signal of the pixel PX completes, the row selection signal SL becomes the L level, and the row selection transistor 5 is turned off.

The pixels PX are arranged in a matrix, and the pixel signal is read in parallel from pixels in one line. In the pixel PX, during a period PT6 after completion of the reset period PT1 until completion of the read period PT5, the photodiode 3 converts the light signal to the electric signal, and generates signal charges.

As shown in FIG. 3, the pixel PX is configured by the photodiode 3 and an N-channel MOS transistor, and the pixel signal is read onto the vertical read line 9 via the row selection transistor 5. Therefore, different from a CCD image sensor, the selection order of the row selection transistor 5 and the vertical read line 9 can be set at random.

Configuration of Pixel Array

Figure 5:
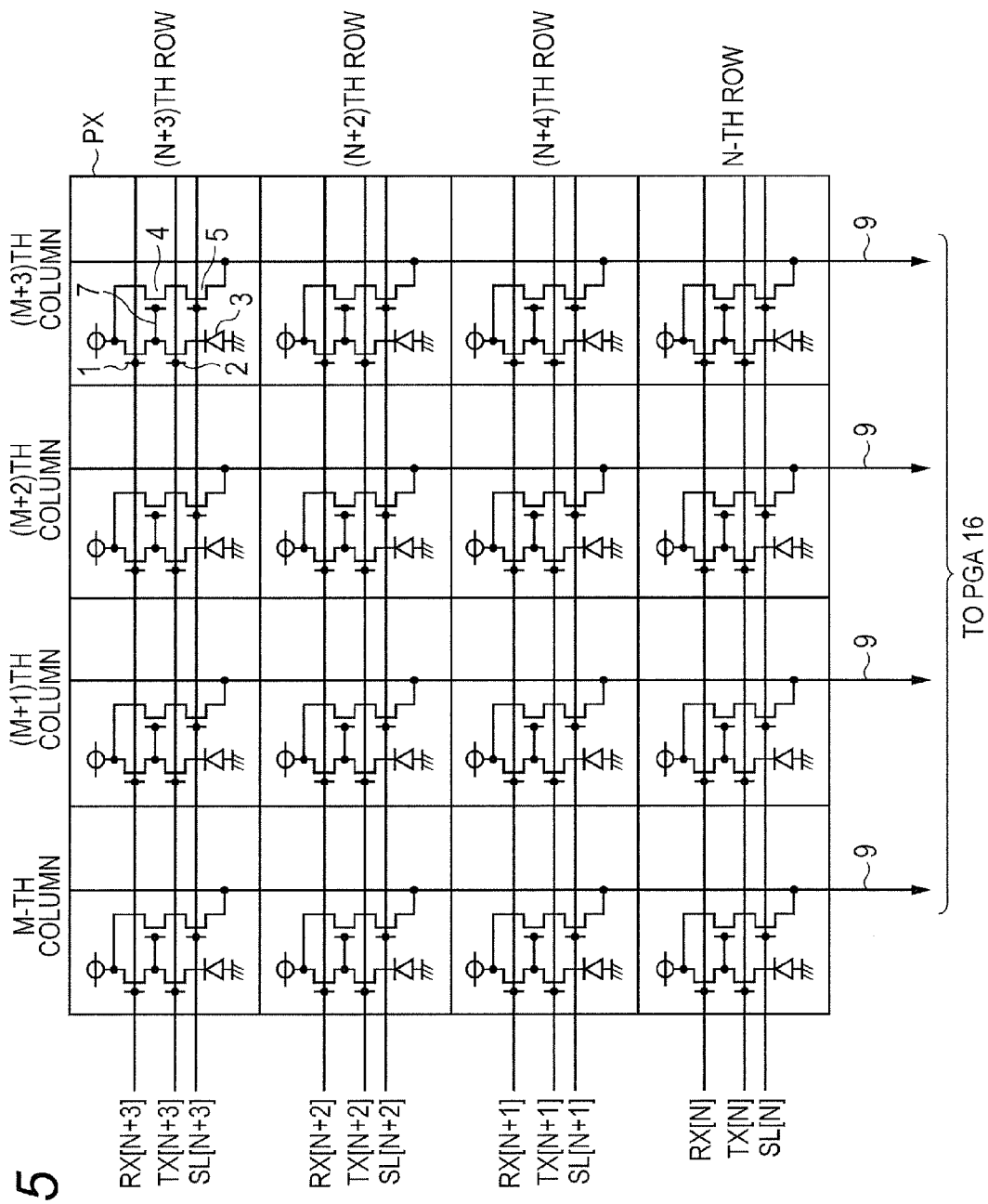
FIG. 5 is a diagram showing the configuration of a main part of a pixel array in FIG. 2.

FIG. 5 is a diagram showing the configuration of a main part of the pixel array in FIG. 2. In FIG. 5, pixels PX arranged in four rows from the N-th row to the (N+3) th row and four columns from the M-th column to the (M+3)th column are representatively shown. Each of the pixels PX has the same configuration as that of the pixel PX shown in FIG. 3.

The pixels PX are arranged in a matrix, and a set of a reset control signal RX[i], a transfer control signal TX[i], and a row selection control signal SL[i] is given to each of the rows. "i" denotes any of N, N+1, N+2, and N+3. For each of the pixel columns, the vertical read line 9 is disposed.

Operation of Reading Data of Pixel Array

Figure 6:
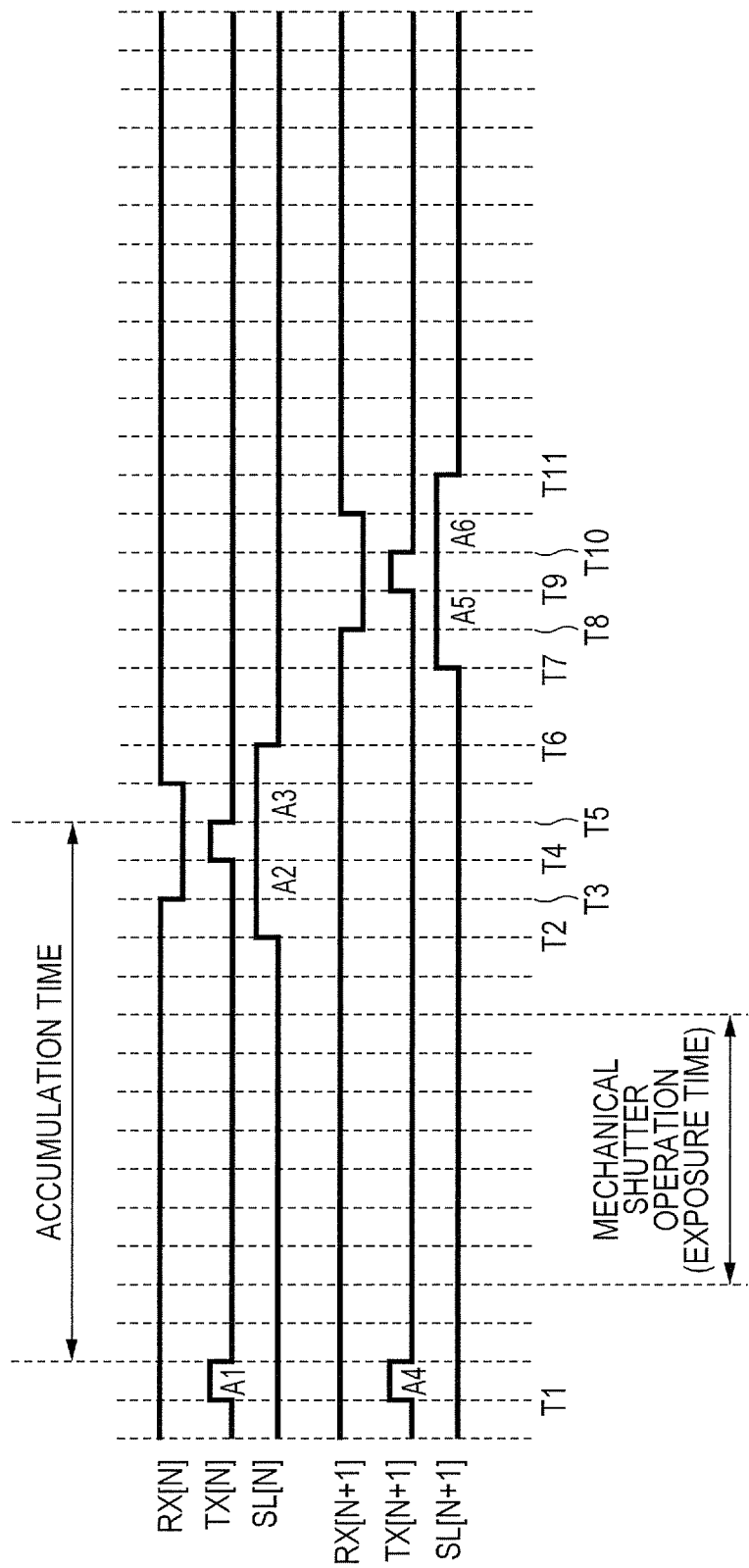
FIG. 6 is a timing chart showing operations at the time of reading data of the pixel array illustrated in FIGS. 2 and 5.

FIG. 6 is a timing chart showing operations at the time of reading data of the pixel array illustrated in FIGS. 2 and 5. Referring to FIG. 6, operation of reading a pixel signal of the pixel array shown in FIGS. 2 and 5 will now be described.

At time T1, the transfer control signals TX[N] and the TX[N+1] for the N-th and (N+1)th rows are driven to the high level. The reset control signals RX[N] and RX[N+1] are at the H level, and the reset transistor 1 is in the on state. In the periods A1 and A4 starting from the time T1, in the N-th and (N+1)th rows, the charges accumulated in the photodiode 3 are released and, accordingly, the floating diffusion 7 shown in FIG. 3 is reset to a predetermined initial voltage level in the N-th and [N+1]th rows.

After lapse of predetermined time, at time T2, a row selection signal SL[N] for the N-th row rises to the H level. In the N-th row, the row selection transistor 5 in the pixel PX is turned on, and a source follower transistor 4 is coupled to the corresponding vertical read line 9.

A reset control signal RX[N] trails to the L level, the reset transistor 1 in each of the pixels in the N-th row is turned off, and the floating diffusion 7 is maintained at the reset potential level.

At time T4, the transfer control signal TX[N] becomes the H level, the transfer transistor 2 is turned on in the pixels in the N-th row, and a signal charge generated by the photodiode 3 is transmitted to the floating diffusion 7. At this time, the row selection signal SL[N] is at the H level, and a pixel signal is sent to each of the vertical read lines 9 in accordance with the potential of the floating diffusion 7.

After completion of the operation of reading the pixels in the N-th row, the reset control signal RX[N] becomes the H level, and the floating diffusion 7 is charged again to the initial voltage level via the reset transistor 1.

At time T6, the row selection signal SL[N] becomes the L level, the row selection transistor 5 is turned off, and reading of the signal charge of the pixel in the N-th row is completed.

Next, signals of pixels in the (N+1)th row are read. Specifically, at time T7, a row selection signal SL[N+1] rises to the H level, and the source follower transistors of the pixels PX in the (N+1)th row are coupled to the corresponding vertical read lines 9.

At time T8, the reset control signal RX[N+1] becomes the L level, and additional operation on the floating diffusion 7 is completed.

At time T9, the transfer control signal TX[N+1] becomes the H level, the potential of the floating diffusion 7 changes according to a signal charge generated by the photodiode 3, and a pixel signal is transmitted onto the vertical read line 9 in accordance with the potential.

At time T11, the row selection signal SL[N+1] trails to the L level, and the reading of the pixels in the N-th and (N+1)th rows is completed. By repeating the operations, information of the pixels in the column direction is sequentially output to the PGA 16.

Configuration of Camera System

Figure 7:
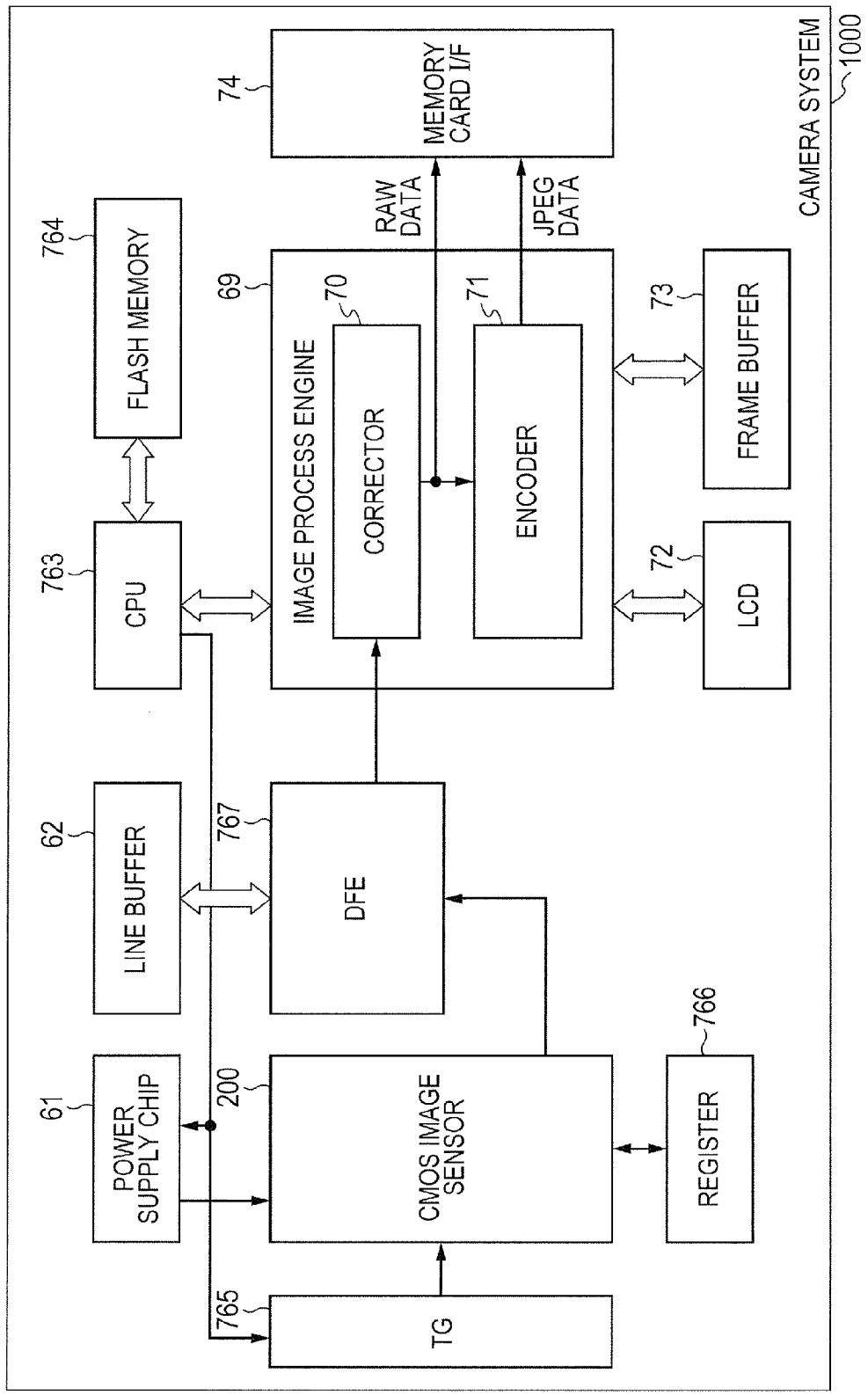
FIG. 7 is a diagram showing the configuration of a camera system of an embodiment of the present invention.

FIG. 7 is a diagram illustrating the configuration of a camera system of an embodiment of the present invention.

With reference to FIG. 7, a camera system 100 has a power supply chip 61, a line buffer 62, a CPU (Central Processing Unit) 763, a flash memory 764, a TG (Timing Generator) 765, the CMOS image sensor 200, a DFE (Digital Front End) 767, an image process engine 69, an LCD (Liquid Crystal Display) 72, a frame buffer 73, a memory card I/F 74, and a register 766.

The power supply chip 61 controls the power supply. The line buffer 62 temporarily stores image data of one row. The CPU 763 controls the entire camera system 1000. The flash memory 764 stores data indicative of a defect position or the like. The TG 765 generates a control signal for controlling the image sensor and supplies it to the image sensor. The CMOS image sensor 200 will be described in the following embodiment. The register 766 stores various setting data. The DFE 767 executes connection correction and the like.

The image process engine 69 includes a corrector 70 and an encoder 71. The corrector 70 executes defect correction and white balance and outputs data before coding (raw data). The encoder 71 executes Bayer correction, gamma correction, and JPEG (Joint Photographic Experts Group) encoding and outputs JPEG data.

The LCD 72 displays image data and the like. The frame buffer 73 is configured by a DDR-SDRAM (Double-Data-Rate Synchronous Dynamic Random Access Memory). The frame buffer 73 temporarily stores digital image data generated by AD conversion. The memory card I/F 74 transmits/receives data to/from a memory card.

Figure 8:
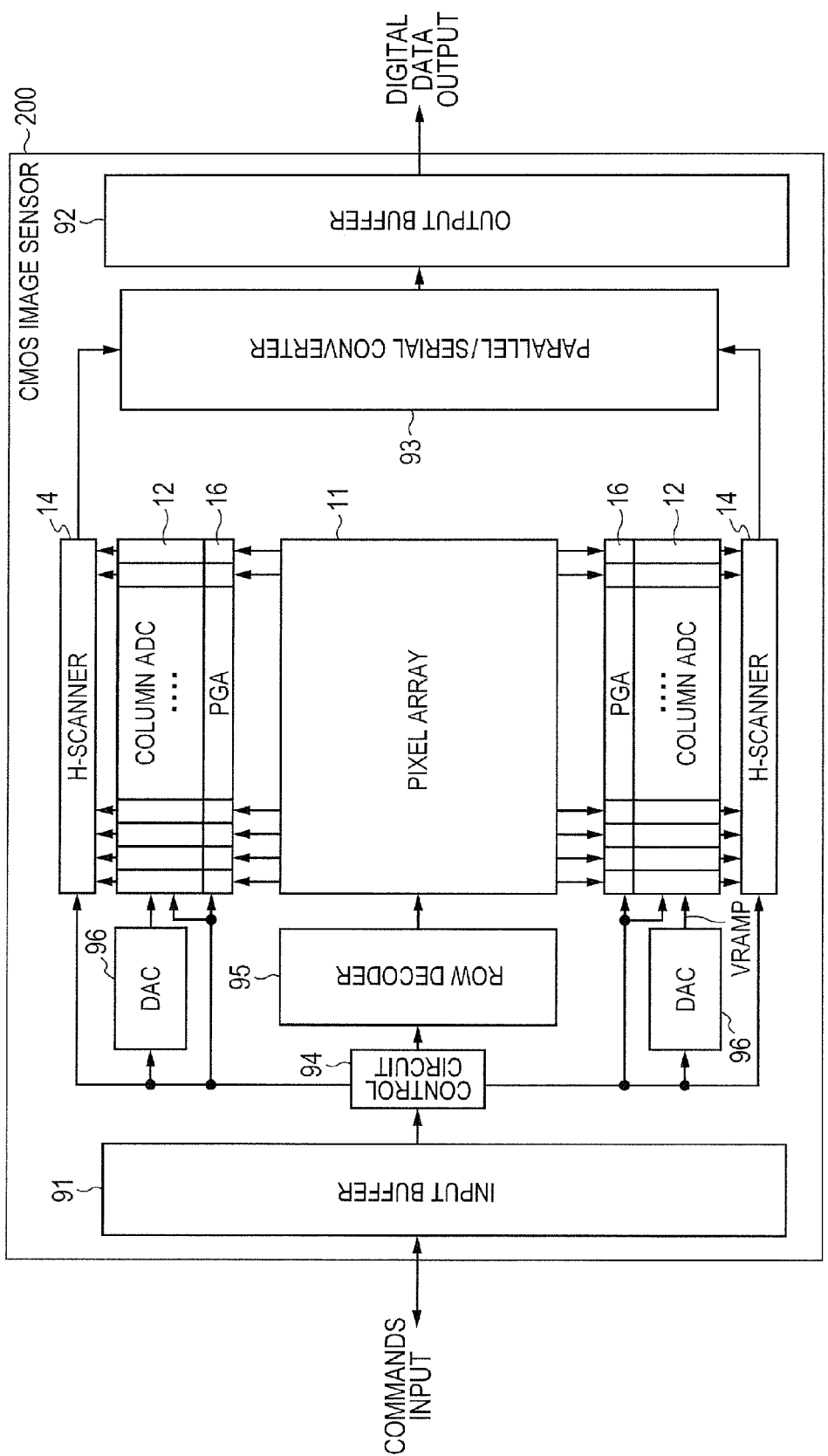
FIG. 8 is a diagram showing a configuration example of a CMOS image sensor according to an embodiment of the invention.

Outline of CMOS Image Sensor according to An Embodiment of the Present Invention Configuration of CMOS Image Sensor FIG. 8 is a diagram showing a configuration example of a CMOS image sensor according to an embodiment of the present invention.

Referring to FIG. 8, the CMOS image sensor 200 has an input buffer 91, a control circuit 94, a row decoder 95, the pixel array 11, a DAC (Digital Analog Converter) 96, the PGA 16, the column ADC 12, an H-scanner (horizontal scanning circuit) 14, a parallel/serial converter 93, and an output buffer 92.

The PGA 16 and the column ADC 12 are provided for each of the columns of the pixel array 11. The PGAs 16 and the column ADCs 12 corresponding to even-numbered columns (0, 2, 4, . . . ) in the pixel array 11 are disposed on the upper side of the pixel array, and the PGAs 16 and the column ADCs 12 corresponding to odd-numbered columns (1, 3, 5, . . . ) in the pixel array 11 are disposed on the lower side of the pixel array.

One H-scanner 14 and one DAC 96 are provided for the odd-numbered columns and one H-scanner 14 and one DAC 96 are provided for the even-numbered columns. The H-scanner 14 transfers digital signals output from the column ADC circuit 12, in the horizontal direction.

The input buffer 91 receives commands and input data from the outside.

The control circuit 94 controls the operations of the entire CMOS image sensor. The row decoder 95 selects a row in the pixel array 11. The control circuit 94 and the row decoder 95 correspond to the V-scanner (vertical scanning circuit) 22 in FIG. 1.

The pixel array 11 functions as an imaging unit as described with reference to FIG. 2. In the pixel array 11, a plurality of pixels each including a photoelectric converting element for converting a light signal to an electric signal are disposed in a matrix. The row decoder 95 sequentially scans the pixels row by row, and the pixel array 11 outputs signals of the pixels in a selected row via a plurality of vertical read lines disposed column by column.

The PGA 16 samples the signals of the pixels output via the vertical read lines. The column ADC 12 holds the signals of the pixels sampled by the PGA 16, and converts the held signals of the pixels as analog signals to digital values.

In the case of the embodiment, the column ADC executes AD conversion in three stages. In the coarse conversion stage, the column ADC specifies any of a plurality of subranges to which the digital value belongs in accordance with signals of pixels held, and generates upper bits (one or plural bits including the most significant bit) expressing the specified subrange. In the middle conversion stage, in the case where the subrange specified at the coarse conversion stage is subdivided into a plurality of subranges, the column ADC specifies a subrange to which the digital value belongs. The column ADC generates a medium bit (one or plural bits subsequent to the bit(s) specified at the coarse conversion stage) indicative of the specified subrange. At the fine conversion stage, the column ADC specifies the position of the digital value in all of the regions of the subranges in which the digital value is specified at the middle conversion stage and a predetermined over-range region of a neighboring subrange in accordance with the signal of the pixel held, and generates lower bits (one or plural bits to the least significant bit) indicative of the specified position. The column ADC outputs a digital value on the basis of the upper bit(s) generated at the coarse conversion stage, the medium bit (s) generated at the middle conversion stage, and the lower bit(s) generated at the fine conversion stage.

The H-scanner 14 transfers, in the horizontal direction, the digital signals which are output from the column ADC 12 corresponding to the columns in the pixel array 11.

The parallel/serial converter 93 converts the parallel data transferred by the H-scanner 14 to serial data, and outputs the serial data to the output buffer 92.

The output buffer 92 outputs output data to the outside. The DAC 96 generates a high voltage VRT and a low voltage VBT at the coarse conversion stage and the middle conversion stage. The DAC 96 generates a ramp voltage VRAMP which changes in a slope shape synchronously with CLK2. Schematic Configuration of ADC and PGA FIG. 9 is a diagram schematically showing a configuration example of a column ADC and a PGA in the embodiment of the invention.

Figure 9:
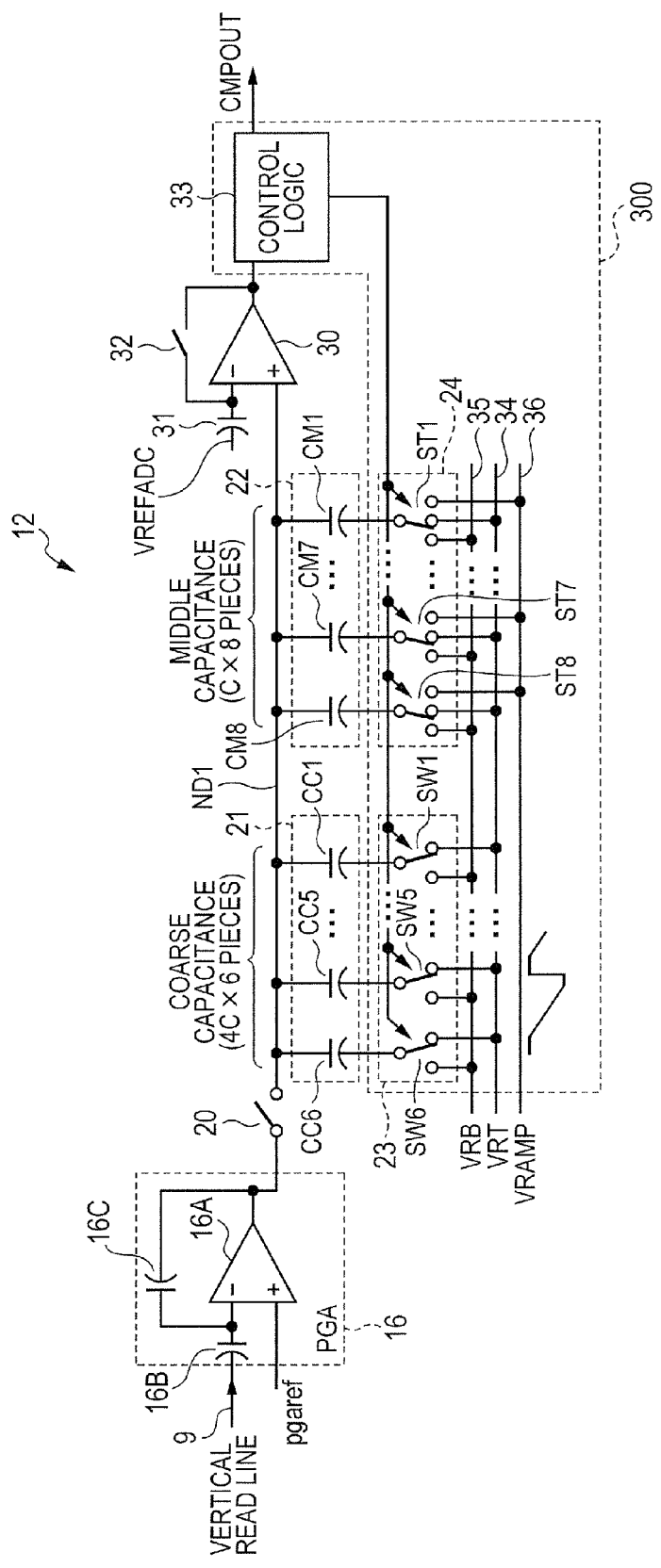
FIG. 9 is a diagram schematically showing a configuration example of a column ADC and a PGA in the embodiment of the invention.

With reference to FIG. 9, the PGA 16 includes a differential amplifier 16A, a capacitor 16B, and a variable capacitor 16C. A reference voltage pgaref is applied to a positive input terminal of the differential amplifier 16A, and a pixel signal is supplied to a negative input terminal from a corresponding vertical read line 9 via the capacitor 16B. The variable capacitor 16C is provided for changing the gain of the PGA 16 and is coupled between the output terminal and the negative input terminal of the differential amplifier 16A.

The column ADC circuit 12 includes a sampling switch 20, an automatic zero (AZ) switch 32, a capacitive element 31 for holding dark voltage, a group of capacitive elements 21 and 22 for sampling a signal voltage, a comparator 30, and a voltage applying unit 300 for applying variable voltage to bottom electrodes of the group of capacitive elements 21 and 22.

The group of capacitive elements 21 and 22 is divided into a coarse capacitive element group 21 and a middle capacitive element group 22. The capacitive element groups are characterized by having capacitance values with weight of a bit. Concretely, in the case of the embodiment, the full capacity of the ADC is divided into 32 capacitances, and a unit capacitance is defined as "C". The coarse capacitance is set to 4C, and six capacitive elements CC1 to CC6 are prepared. The middle capacitance is set to C, and eight capacitive elements CM1 to CM8 are prepared. Therefore, the capacitance value of total 32C is resulted. The capacitive elements CM1 to CM8 of the middle conversion are also used for fine conversion. The regions of AD conversion divided on the capacitance unit basis will be called subranges.

The first electrode (also called "top electrode" or upper electrode") of each of the capacitive elements CC1 to CC6 and CM1 to CM8 is coupled to a node ND1 (called retention node) for retaining the signal voltage. The retention node ND1 is coupled to the PGA 16 via the sampling switch 20 and also coupled to the positive input terminal of the comparator 30. The capacitive element 31 is provided between the negative input terminal of the comparator 30 and a reference voltage node VREFADC (for example, an existing low-impedance node such as a VRT node). The AZ switch 32 is coupled between the negative input terminal and the output terminal of the comparator 30.

In the case of the embodiment, the voltage applying unit 300 includes voltage lines 34, 35, and 36 supplying the control voltages VRT, VRB, and VRAMP, respectively, switch groups 23 and 24, and a control logic circuit 33 controlling switching between the switch groups 23 and 24. The control voltage VRT is a fixed voltage of, for example, 2.0V, and the control voltage VRB is a fixed voltage of, for example, 1.0V. The control voltage VRAMP continuously changes in a slope state between the high voltage VRT and the low voltage VBR or in a range obtained by adding an over range amount to the voltage range. To the control logic circuit 33, a control signal is supplied from the control circuit 94. The details will be described later with reference to FIG. 16 and subsequent drawings.

The switch group 23 includes switches SW1 to SW6 corresponding to the capacitive elements CC1 to CC6, respectively, and the switch group 24 includes switches ST1 to ST8 corresponding to the capacitive elements CM1 to CM8, respectively. Each of the switches SW1 to SW6 switches between coupling of a second electrode (also called "bottom electrode" or "lower electrode") of corresponding one of the capacitive elements CC1 to CC6 to the voltage line 34 for supplying the VRT voltage and coupling of the second electrode to the voltage line 35 for supplying the VRB voltage. Each of the switches ST1 to ST8 switches between coupling of a second electrode (bottom electrode) of corresponding one of the capacitive elements CM1 to CM8 to the voltage line 34 for supplying the VRT voltage and coupling of the second electrode to the voltage line 36 for supplying the VRAM voltage.

The AD converting operation by the column ADC 12 having the above-described configuration will now be described.

(Basic Concept of AD Conversion)

First, the basic concept of AD conversion performed by the column ADC 12 of FIG. 9 will be described. The comparator 30 determines the level of the dark voltage supplied to the negative input terminal and the signal voltage supplied to the positive input terminal and outputs a determination result (H level or L level). In an initial state, the bottom electrodes of the capacitive elements CC1 to CC6 and CM1 to CM8 are coupled to the voltage line 34 (VRT voltage) by the switch groups 23 and 24. Due to the switching of the switch groups 23 and 24 in the process of AD conversion, the potential at the retention node ND1 changes. By the change, the output of the comparator 30 is inverted from the H level to the L level. Time required for the inversion of the output of the comparator 30 varies according to the input voltage level. Therefore, the time required for inverting the output of the comparator 30 is measured, and an output code can be calculated from the count value. It will be described below step by step.

Step 1: Dark-Signal Sampling

A signal supplied to the column ADC 12 is configured by the dark level and the signal level. First, in the dark sampling period, the column ADC 12 samples the dark voltage. When the sampling switch 20 is turned on, the AZ switch 32 coupled to the comparator 30 is also turned on. In such a manner, the dark level is sampled in the capacitive element 31. When the sampling switch 20 and the AZ switch 32 are turned off, the dark voltage level held in the capacitive element 31 is determined.

Next, in the signal sampling period, the column ADC 12 samples the signal voltage. Concretely, when the sampling switch 20 is turned on, the signal voltage supplied to the ADC 12 is sampled in the capacitive element groups 21 and 22. When the sampling switch 20 is turned off, the potential of the top electrode of each of the capacitive element groups 21 and 22 (that is, the potential of the retention node ND1) is determined.

Steps 2 to 4: Outline of AD Converting Operation

The AD conversion by the column ADC 12 of FIG. 9 is made by low-precision high-speed AD conversion (coarse conversion), intermediate-precision high-speed AD conversion (middle conversion), and high-precision low-speed AD conversion (fine conversion).

In the coarse conversion and the middle conversion, operation of sequentially switching the voltage applied to the bottom electrode of the capacitive element group from the high reference voltage (VRT) to the low reference voltage (VRB) is performed. By the operation, the voltage at the retention node ND1 (the voltage of the positive input terminal of the comparator 30) decreases discretely (step by step) and, at certain time point, the logic level of an output signal of the comparator 30 is inverted. At the time point when the logic level of the output signal of the comparator 30 is inverted, the switching of the voltage applied to the bottom electrode of the capacitive element group is finished.

In the fine conversion, using the control voltage (VRAMP) which gradually degreases from VRT to VRB, the voltage at the retention node ND1 (voltage of the positive input terminal of the comparator 30) is continuously decreased.

For each of the coarse conversion, the middle conversion, and the fine conversion, resetting operation is performed. In the resetting operation, by switching the voltage of the bottom electrode of each of the capacitive elements configuring the middle capacitive element group 22 from VRB to VRT, the voltage at the retention node ND1 (the voltage at the positive input terminal of the comparator 30) rises.

Step 2: Coarse AD Conversion

First, in the coarse conversion period, the control logic circuit 33 performs either single-element switching of sequentially switching the voltage applied to each of the bottom electrodes of the capacitive elements CC1 to CC6 prepared for the coarse conversion in the capacitive element groups 21 and 22 from VRT to VRB, or plural-element switching of sequentially switching the voltage applied to a group of four capacitive elements in the capacitive elements (CM1 to CM8) prepared for the middle conversion (CM1 to CM4 and CM5 to CM8) from VRT to VRB.

More concretely, first, the control logic circuit 33 switches the potentials of the bottom electrodes of the capacitive elements CM1 to CM4 in a lump. The control logic circuit 33 switches the potentials of the bottom electrodes of the capacitive elements CM5 to CM8 in a lump. Subsequently, the control logic circuit 33 sequentially switches the potentials of the bottom electrodes of the capacitive elements CC1 to CC6 one by one. Accompanying the switching operation, the potential at the retention node ND1 decreases by (VRT−VRB)/8. After the logic level of the output signal of the comparator 30 is inverted, the control logic circuit 33 stops switching the potentials of the bottom electrodes of the capacitive elements.

After completion of the coarse AD conversion, the control logic circuit 33 performs operation of resetting the potentials of the bottom electrodes of CM2 to CM4 or CM6 to CM8 in the capacitive elements prepared for the middle conversion from VRB to VRT. The operation will be called coarse resetting operation. For example, in the embodiment, in the case where, after switching the potentials of the bottom electrodes of the capacitive elements CM1 to CM4 from VRT to VRB in a lump in the coarse conversion, the output signal of the comparator 30 is inverted, in the coarse resetting operation, the potentials of the bottom electrodes of the capacitive elements CM2 to CM4 are reset. In the coarse conversion, in the case where the output signal of the comparator 30 is inverted after the potentials of the bottom electrodes of the capacitive elements CM5 to CM8 are switched from VRT to VRB in a lump or after the following switching of the potential of the bottom electrode of any of the capacitive elements CC1 to CC6, in the coarse resetting operation, the potentials of the bottom electrodes of the capacitive elements CM6 to CM8 are reset.

Step 3: Middle AD Conversion

In the middle conversion period, the control logic circuit 33 sequentially switches the potentials of the bottom electrodes of the capacitive elements (CM2 to CM4 or CM6 to CM8) which are reset in the coarse resetting operation in the capacitive element group 22 prepared for the middle conversion and the fine conversion from VRT to VRB one by one. Accompanying the switching, the potential at the retention node ND1 decreases by (VRT−VRB)/32. The control logic circuit 33 stops switching of the bottom electrode potential after the output of the comparator 30 is inverted.

After completion of the middle AD conversion, the control logic circuit 33 performs operation of resetting the bottom electrode potential of the capacitive element which is switched to VRB at last to VRT. In the case where any of the capacitive elements CM2 to CM4 or CM6 to CM8 does not switch the potential from VRT to VRB in the middle conversion, operation of resetting the bottom electrode potential of the capacitive elements to VRT is not performed. The operation is called the middle resetting operation.

Step 4: Fine AD Conversion

In the fine conversion period, the control logic circuit 33 switches the potential of the bottom electrode of one of the capacitive elements CM1 to CM8 prepared for the middle conversion and the fine conversion. As the capacitive element whose bottom electrode potential is switched, the capacitive element which is reset in the middle resetting operation is used. In the case where the potential of any of the capacitive elements CM2 to CM4 or CM6 to CM8 is not switched from VRT to VRB in the middle conversion, the capacitive element CM1 or CM5 is used. A circuit configuration of automatically selecting the capacitive element by the control signal in each of the column ADCs 12 is employed (a concrete circuit configuration will be described later).

The bottom electrode of the capacitive element to be subjected to voltage switching in the fine period is coupled to the voltage line 36 to which the VRAMP potential is supplied. The VRAMP potential is changed in the voltage range from VRT to VRB or the range exceeding the voltages from VRT to VRB. The former range is the minimum necessary voltage range, and the latter range is a range including margins for various determination errors. During the fine AD conversion, different from the coarse conversion and the middle conversion, the potential of the retention node ND1 continuously decreases. The control logic circuit 33 has a configuration that also after the logic level of the output signal of the comparator 30 is inverted, decrease in the potential of the retention node ND1 is not stopped.

Operation Effect of Column ADC (No. 1)

Next, the effect of the ADC having the above-described configuration will be described. In the column ADC 12, by giving weight to the related-art coarse converting operation, low-precision high-speed AD conversion (coarse conversion) and intermediate-precision high-speed AD conversion (middle conversion) are executed. Concretely, by making the capacitance value of the capacitive elements CC1 to CC6 for the coarse conversion and the capacitance value of the capacitive elements CM1 to CM8 for the middle conversion different from each other, weighting is performed. As a result, increase in speed of the AD conversion is realized. Hereinafter, it will be described with a comparative example.

Figure 10:
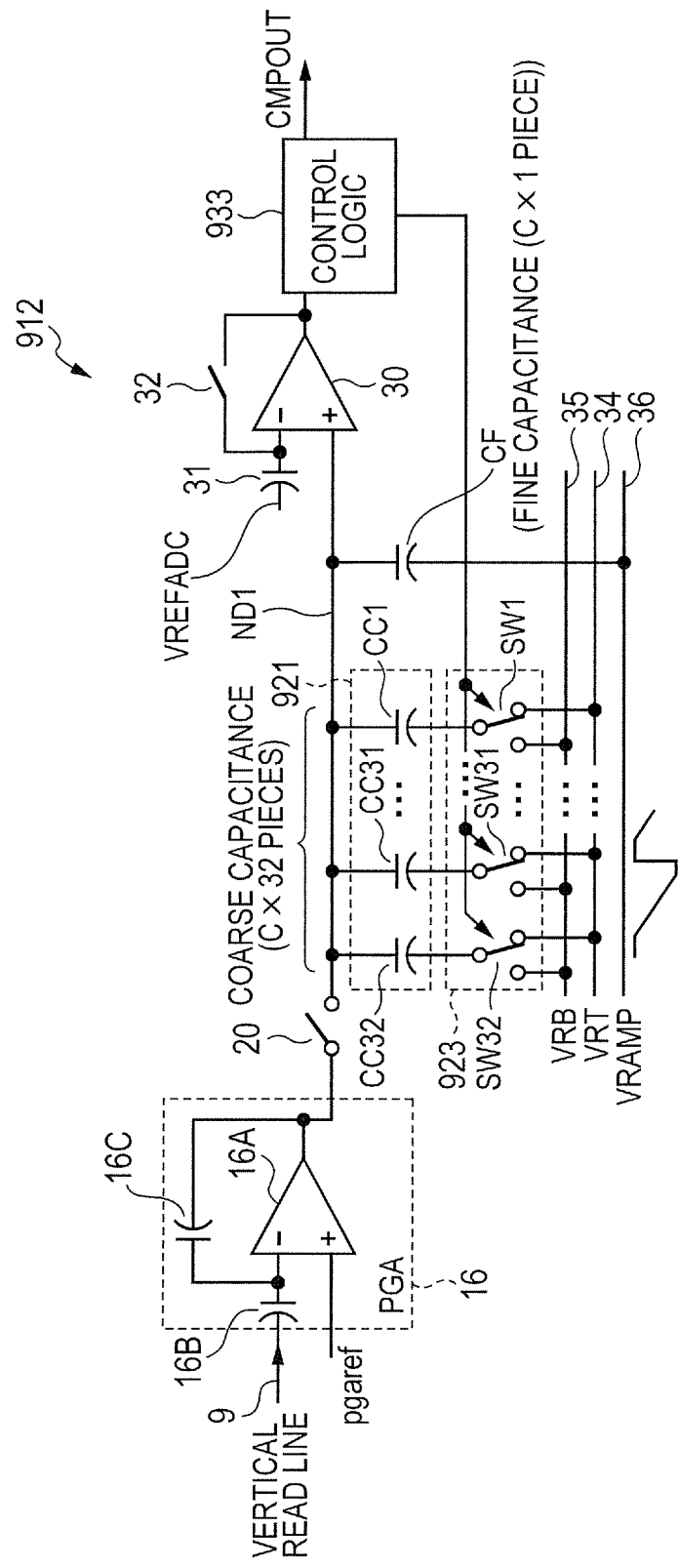
FIG. 10 is a diagram showing the configuration of a column ADC 912 as a comparative example of the embodiment.

FIG. 10 is a diagram showing the configuration of a column ADC 912 as a comparative example of the embodiment. The column ABC 912 of FIG. 10 is different from the column ADC 12 of the embodiment illustrated in FIG. 9 with respect to the point that only a capacitive element group 921 for the coarse conversion is provided without providing the capacitive element group 22 for the middle conversion. Further, the column ADC 912 of FIG. 10 is different from the column ADC 12 of the embodiment illustrated in FIG. 9 with respect to the point that a single capacitive element CF for the fine conversion is provided.

As shown in FIG. 10, to obtain the same subranges as those of the embodiment only by the coarse conversion, the capacitive element group 921 has to be provided with 32 capacitive elements CC1 to CC32 (the capacitance value is unit capacitance C). Switches SW1 to SW32 are provided in correspondence with the capacitive elements CC1 to CC32, respectively. In the coarse conversion, connection destination of the bottom electrodes of the capacitive elements CC1 to CC32 is sequentially switched from the voltage line 34 (VRT potential) to the voltage line 35 (VRB potential) by the corresponding switches SW1 to SW32.

FIGS. 11A and 11B are comparative diagrams illustrating AD converting operation of the column ADC 12 of FIG. 9 and AD converting operation of the column ADC 912 of FIG. 10. FIG. 11A illustrates the circuit operation of the column ADC 912 in the comparative example shown in FIG. 10, and FIG. 11B illustrates the circuit operation of the column ADC 12 in the embodiment shown in FIG. 9. In FIGS. 11A and 11B, the vertical axis indicates the potential of the retention node ND1, and the horizontal axis indicates time.

Referring to FIG. 11A, since the entire conversion range (full scale) is divided into 32 subranges (5-bit precision), in the configuration of the comparative example of FIG. 10, the comparing operation by the comparator 30 has to be performed 31 times. After the coarse converting operation, fine conversion of 9-bit precision in which the voltage of the retention node ND1 continuously changes is executed.

Referring to FIG. 11B, in the configuration of the embodiment of FIG. 9, first, the comparing operation by the comparator 30 has to be performed seven times in the coarse converting operation of 3-bit precision. In the following middle converting operation of 2-bit precision, the comparing operation by the comparator 30 has to be performed three times. Therefore, ten comparing operations in total are necessary. After the coarse conversion and the middle conversion, the fine conversion of 9-bit precision in which the voltage at the retention node ND1 changes continuously is executed.

As described above, in contrast to the comparative example illustrated in FIG. 10, in the embodiment, the number of determination times can be reduced from 31 times to 10 times, and the increase in the speed of the AD conversion can be realized.

Operation Effect of Column ADC (No. 2)

In the case of the column ADC 12 illustrated in FIG. 9, to the capacitive element (on which middle resetting operation is performed) whose bottom electrode potential is switched from VRT to VRB at last in the middle conversion, the slope voltage VRAMP is applied in the following fine conversion.

As a result, linearity in the subrange connection parts can be improved. Hereinafter, it will be concretely described with reference to FIG. 12.

Figure 12A:
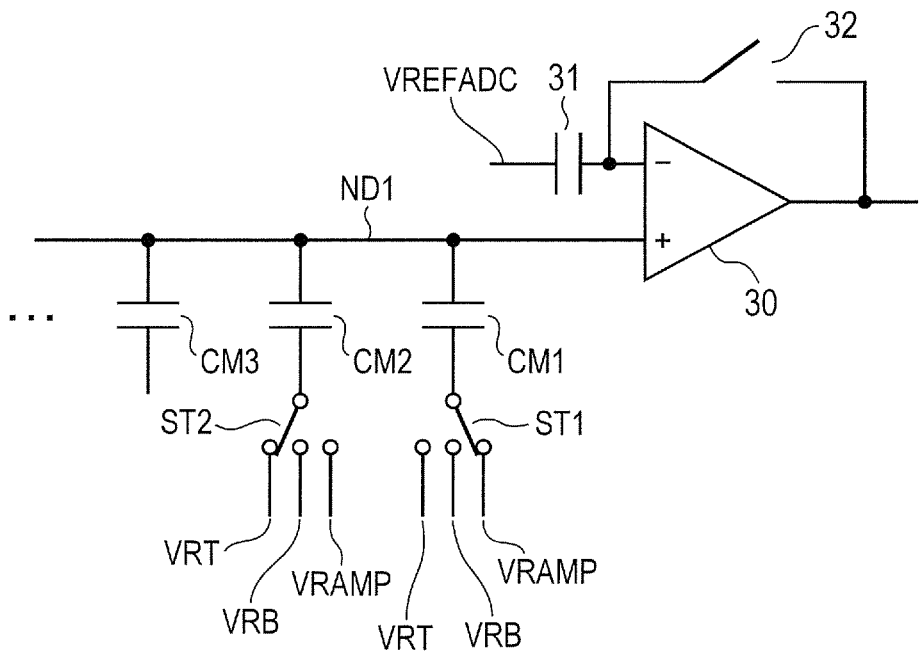
FIGS. 12A and 12B are diagrams for explaining improvement in linearity in a sub-range connection part.
Figure 12B:
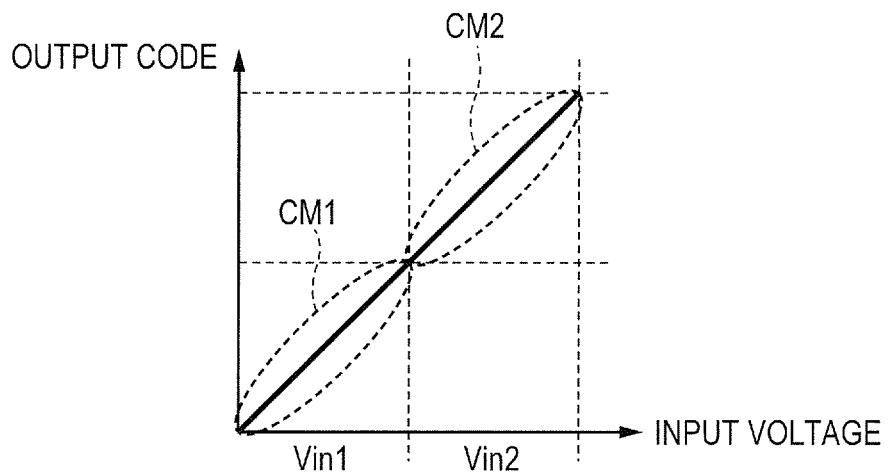

FIGS. 12A and 12B are diagrams for explaining improvement in linearity in a sub-range connection part. FIG. 12A is a diagram illustrating a part of FIG. 9, and FIG. 12B is a diagram illustrating the relation between the input voltage and the output code of the column ADC 12.

With reference to FIGS. 12A and 12B, it is assumed that the bottom electrode potentials are switched in order of the capacitive elements CM1, CM2, CM3, . . . in the middle conversion. The connection destination of the capacitive elements CM1, CM2, and CM3 can be switched to any of a node to which the VRT voltage is supplied (also called "VRT node"), a node to which the VRB voltage is supplied (also called "VRB node"), and a node to which the VRAMP voltage is supplied (also called "VRAMP node").

In the case of Vin1 whose input voltage range (subrange) is the lowest, the potential at the bottom electrode of the capacitive element CM1 is an object of the middle resetting operation. In this case, in the fine conversion, the slope voltage VRAMP is applied to the bottom electrode of the capacitive element CM1. In the case of Vin2 whose input voltage range (subrange) is the second lowest, the capacitive element CM2 is an object of the middle resetting operation. In this case, in the fine conversion, the slope voltage VRAMP is applied to the bottom electrode of the capacitive element CM2. Since the voltage switching by the middle conversion and the application of the slope voltage by the fine conversion is performed on the same capacitive element as described above, no jump occurs in the output cord in the border between the subranges Vin1 and Vin2.

On the other hand, in the column ADC 912 of the comparative example illustrated in FIG. 10, the capacitive element CF dedicated to the fine conversion is provided. Consequently, for example, when the input voltage range is Vin1 in FIG. 12B, if the capacitance value of the capacitive element CM1 and that of the capacitive element CF are different from each other, the voltage change amount at the retention node ND1 varies. As a result, a jump occurs in the output cord in the border between the subranges Vin1 and Vin2.

In short, when the capacitive element CF is used for the fine conversion different from the middle conversion as in the comparative example of FIG. 10, there is the influence of manufacture variations of the capacitive elements. In contrast, in the case of the embodiment, since the same capacitance is used in the middle conversion and the fine conversion, the influence of element variations can be eliminated.

Operation Effect of Column ADC (No. 3)

As described above, in the column ADC 12, the capacitive element whose bottom electrode potential is switched from VRT to VRB at last at the middle conversion stage is reset by the middle resetting operation and, further, is used as the capacitive element for the next fine conversion. A circuit configuration for automatically performing the operation will be described.

Figure 13:
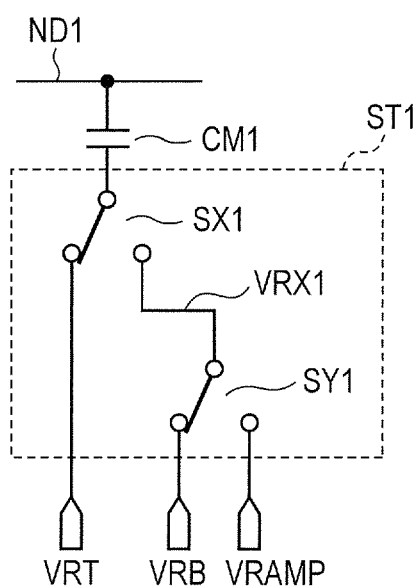
FIG. 13 is a diagram for explaining a concrete configuration of a switch ST1 in FIG. 9.

FIG. 13 is a diagram for explaining a concrete configuration of the switch ST1 in FIG. 9. Since the configuration of the switches ST2 to ST8 is similar, the switch ST1 will be described as a representative. As described above, the switch ST1 is provided to switch the connection destination of the bottom electrode of the capacitive element CM1 to any of the VRT node, the VTB node, and the VRAM node. The switch ST1 can be considered as a combination of two switches SX1 and SY2.

Referring to FIG. 13, the switch ST1 is made by the switch SX1 for switching the connection destination of the bottom electrode of the capacitive element CM1 between the VRT node and the intermediate node VRX1 and the switch SY2 for switching the connection destination of the intermediate node VRX1 between the VRAMP node and the VRB node. As will be described specifically hereinafter, the switch SY2 is switched interlockingly with a switch SX2 for switching the connection destination of the bottom electrode of the capacitive element CM2.

Figure 14:
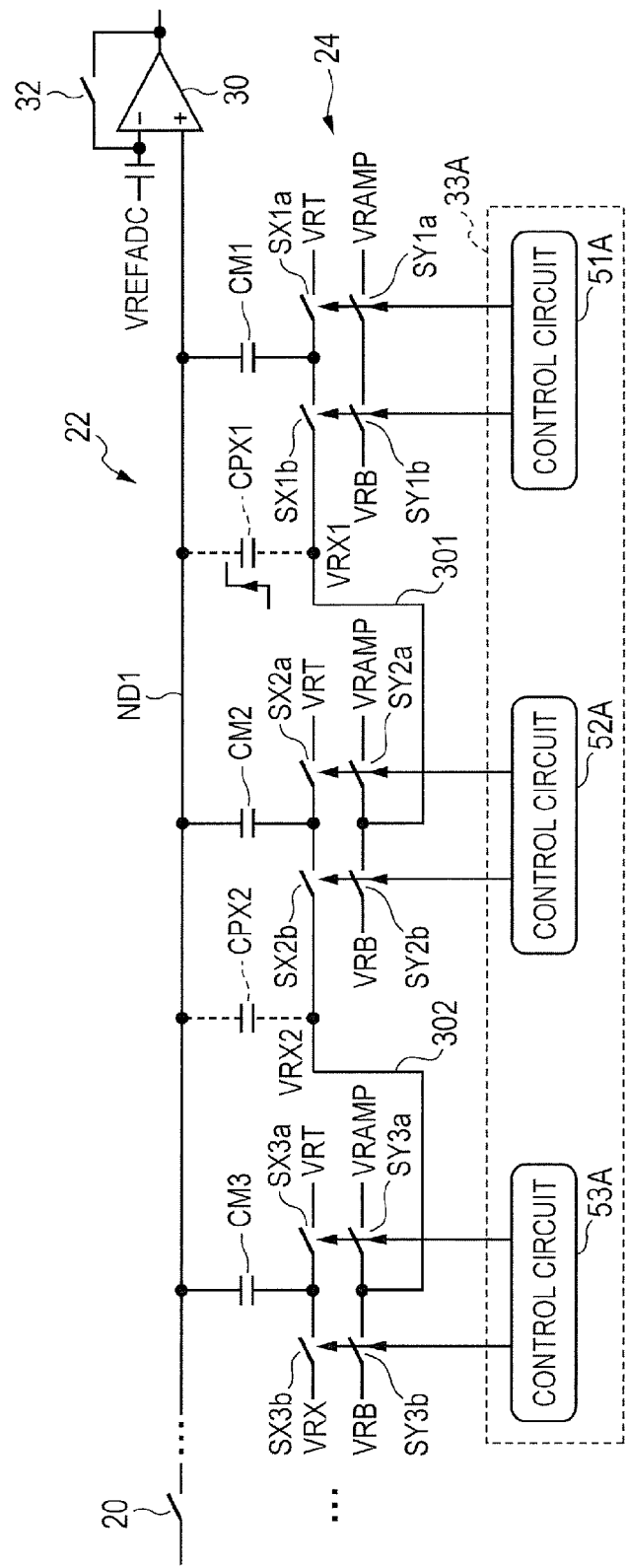
FIG. 14 is a diagram showing a concrete configuration example of a switch group 24 in FIG. 9.

FIG. 14 is a diagram showing a concrete configuration example of the switch group 24 in FIG. 9. Referring to FIG. 14, the switch group 24 includes: a pair of switch elements SX1 (SX1a and SX1b) coupled to the bottom electrode of the capacitive element CM1; a pair of switch elements SX2 (SX2a and SX2b) coupled to the bottom electrode of the capacitive element CM2; and a pair of switch elements SX3 (SX3a and SX3b) coupled to the bottom electrode of the capacitive element CM3. Although not shown in FIG. 14, pairs of switch elements SX4 to SX8 are also coupled to the bottom electrodes of the capacitive elements CM4 to CM8. When one switch element in the pair of switch elements (SX1 to SX8) is on, the other switch element is off. Each of switch elements SX1a, SX2a, SX3a, . . . , and SX8a is used to couple the VRT node (the voltage line 34 in FIG. 9) and the bottom electrode of corresponding one of the capacitive elements CM1 to CM8. Each of switch elements SX1b, SX2b, SX3b, . . . , and SX8b is used to couple the corresponding intermediate node VRX1, VRX2, . . . , or VRX8 and the bottom electrode of corresponding one of the capacitive elements CM1 to CM8. The intermediate node VRX8 is common to the voltage line 36 for supplying VRAMP.

The switch group 24 also includes pairs of switch elements SY1 (SY1a and SY1b) to SY8 (SY8a and SY8b) which switch interlockingly with the pairs of the switch elements SX1 (SX1a and SX1b) to SX8 (SX8a and SX8b). For example, when SX2a is in the on state and SX2b is in the off state, SY2a is in the on state, and SY2b is in the off state.

The switch elements SY2, SY3, SY4, SY5, SY6, SY7, and SY8 correspond to intermediate nodes VRX1, VRX2, VRX3, VRX4, VRX5, VRX6, and VRX7, respectively, (correspond to intermediate nodes each having the immediately preceding number). Interlockingly with switching of the corresponding switch elements SX2 to SX8, (switching from the VRT node to the intermediate node), each of the switch elements SY2 to SY8 switches the connection destination of the corresponding intermediate node VRX from the VRAMP node to the VRB node.

A control logic circuit 33A has a control circuit 51A for interlockingly switching the switch elements SX1 and SY1, a control circuit 52A for interlockingly switching the switch elements SX2 and SY2, and a control circuit 53A for interlockingly switching the switch elements SX3 and SY3. Although not illustrated in FIG. 14, the other switch elements SX4 to SX8 (SY4 to SY8) are also provided with control circuits 54A to 58A, respectively.

The operation of the switch element group having the above-described configuration will now be described. First, in the coarse conversion and the middle conversion period, the VRB voltage is applied to the VRAMP node. By the coarse resetting operation, the switch elements SX2a and SX3a are turned on and, interlockingly, the switch elements SY2a and SY3a re turned on. That is, the bottom electrodes of the capacitive elements CM2 and CM3 are coupled to the VRT node. The switch elements SX1a and SY1a remain in the off state (remain switched by the coarse converting operation).

First, in the state where the first switch element SX1a is off and the switch element SX1b is on, the bottom electrode of the capacitive element CM1 is coupled to the VRAMP node via the intermediate node VRX1 and the switch element SY2a. If the logic level of the output signal of the comparator 30 is not inverted in this state, the program advances to the next step.

Next, the switch element SX2a is turned off, and the switch element SX2b is turned on. Accordingly, the bottom electrode of the capacitive element CM2 is coupled to the VRAMP node via the intermediate node VRX2 and the switch element SY3a. Interlockingly with the switching of the switch element SX2, the switch element SY2a is turned off, and the switch element SY2b is turned on. It makes the bottom electrode of the capacitive element CM1 coupled to the VRB node via the intermediate node VRX1 and the switch element SY2b. Therefore, the electrode coupled to the VRAMP node at this time point is the bottom electrode of the capacitive element CM2. As described above, only the bottom electrode of one capacitive element is coupled to the VRAMP node.

When the logic level of the comparator 30 is inverted in this state, the following switch elements SX3 and SX4 are not switched. In the next middle resetting operation, the voltage supplied to the VRAMP is reset from VRB to VRT. Accordingly, the potential at the bottom electrode of the capacitive element CM2 coupled to the VRAMP node at this time point is reset.

In the next fine conversion, the voltage in the slope state which continuously changes from VRT to VRB is applied to the VRAMP node. The voltage in the slope state is consequently applied to the potential at the bottom electrode of the capacitive element CM2 coupled to the VRAMP node at this time point.

Operation Effect of Column ADC (No. 4)

In the circuit shown in FIG. 14, to control the bottom electrode potential of each of the capacitive elements CM1, CM2, . . . , the nodes of VRX1, VRX2, (hereinbelow, generically called "VRX node") are used. Since parasitic capacitance between wires exists in a device manufactured on a substrate in reality, the VRX node is capacitive-coupled to each of the nodes such as the retention node ND1 coupled to the positive input terminal of the comparator 30, via the parasitic capacitance. Since the voltage change in the VRX node propagates due to the capacitive coupling via the parasitic capacitance, there is the possibility that linearity of the ADC deteriorates. The voltage change becomes an issue particularly in the middle resetting operation. Consequently, FIG. 15 provides a configuration for cancelling the influence of the parasitic capacitance.

Figure 15:
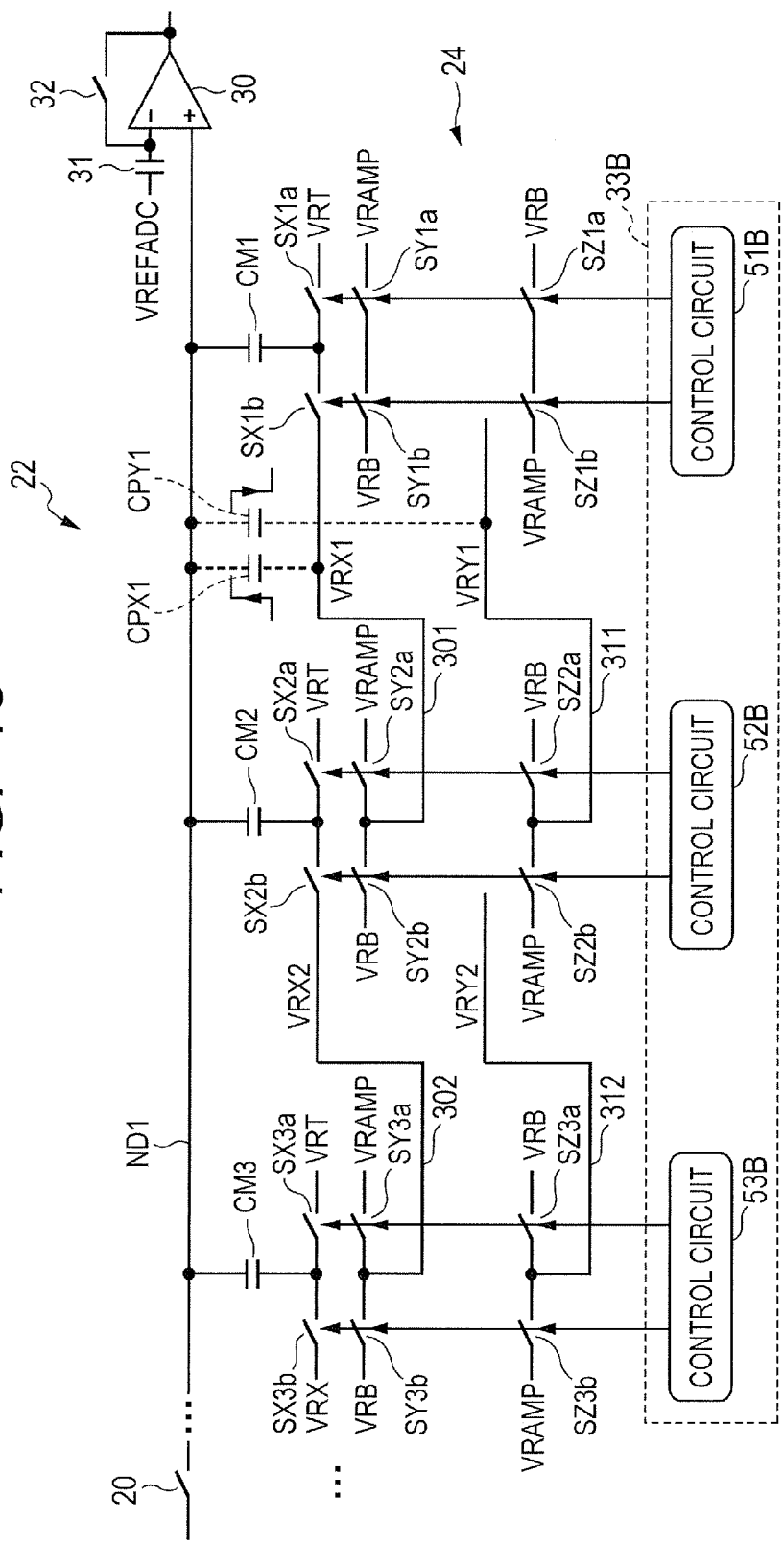
FIG. 15 is a diagram showing another concrete configuration example of the switch group 24 in FIG. 9.

FIG. 15 is a diagram showing another concrete configuration example of the switch group 24 in FIG. 9. In FIG. 15, VRY nodes (VRY1, VRY2, . . . ) which operate differentially with respect to the VRX nodes are provided.

A control logic circuit 33B has a control circuit 51B for interlockingly switching the switch elements SX1, SY1, and SZ1 (SZ1a and SZ1b), a control circuit 52B for interlockingly switching the switch elements SX2, SY2, and SZ2 (SZ2a and SZ2b), and a control circuit 53B for interlockingly switching the switch elements SX3, SY3, and SZ3 (SZ3a and SZ3b). Although not illustrated in FIG. 15, the other switch elements (SX4, SY4, SZ4) to (SX8, SY8, SZ8) are also provided with control circuits 54B to 58B, respectively.

To make the potential change in the VRY node operate differentially with respect to the VRX node, a pair of switch elements SZ1 (SZ1a, SZ1b) and SZ2 (SZ2a, SZ2b) is provided. The switch elements SZ1, SZ2, SZ3, . . . are switched interlockingly with switching of the switch elements SX1, SX2, SX3, . . . . For example, when SX2a is turned off and SX2b is turned on, SZ2a is turned off, and SZ2b is turned on.

Each of the switch elements SZ1a, SZ2a, SZ3a, is positioned between the corresponding VRY node and the VRB node. Each of the switch elements SZ1b, SZ2b, SZ3b, . . . is positioned between the corresponding VRY node and the VRAMP node. The coupling relation between nodes is characterized by being opposite to that in the case of the switch elements SY1, SY2, . . . .

In an actual circuit layout, a dummy line 311 coupling the switch SZ2 and the node VRY2 is provided close to a line 301 coupling the switch element SY2 and the node VRX1. Similarly, a dummy line 312 is provided close to a line 302. With the configuration, the parasitic capacitance against the VRX node and that against the VRY node become the same, so that a potential change in the retention node ND1 in the middle resetting operation can be cancelled.

In the case where no VRY node exists, a transfer function from the VRAMP node to the retention node ND1 (YCM) in the fine conversion period changes according to the number of VRX nodes coupled to the VRAMP node and therefore varies for each of subranges. To cancel the influence, coupling between the VRY node and the VRAMP node is controlled so as to be complementary to that between the VRX node and the VRAMP node so that the sum of the number of VRX nodes and the number of VRY nodes coupled to the VRAMP node becomes constant.

Although another concrete configuration example of the switch group 24 of FIG. 9 has been described with reference to FIGS. 14 and 15, in the control logic circuit 33 which will be described later, a control logic circuit 33B is described in detail.

Concrete Configuration Diagram of Column ADC
(Sampling Switch 20, Capacitive Element Group 21, Switch Group 23, and the like)

Figure 16:
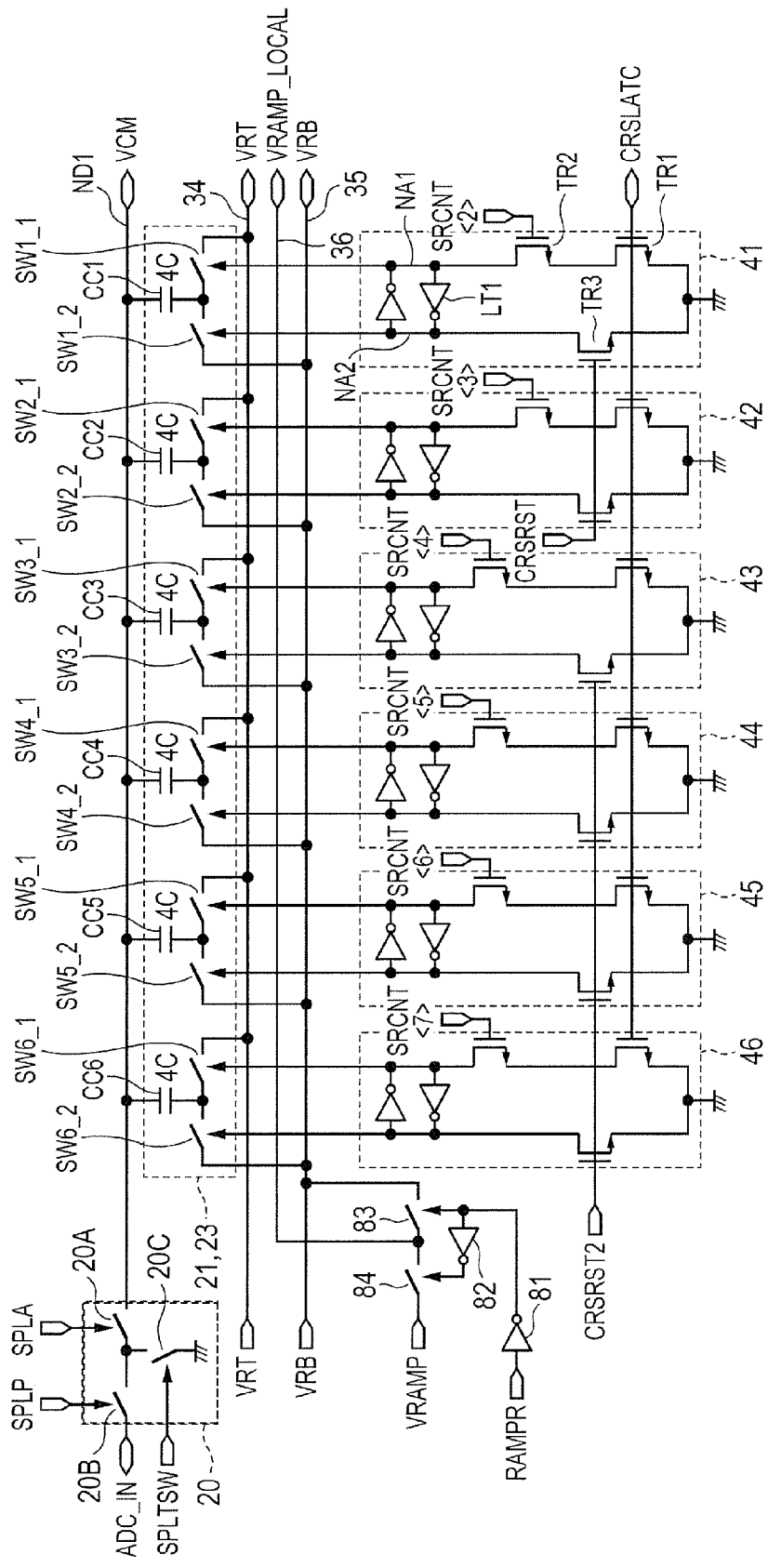
FIG. 16 is a circuit diagram showing a concrete configuration of a sampling switch 20, a capacitive element group 21, a switch group 23, and control circuits 41 to 46 for controlling the switch group 23.

FIG. 16 is a circuit diagram showing a concrete configuration of the sampling switch 20, the capacitive element group 21, the switch group 23, and control circuits 41 to 46 for controlling the switch group 23.

Referring to FIG. 16, the sampling switch 20 includes switch elements 20A, 20B, and 20C.

The switch elements 20A and 20B are coupled in series between an output node (ADC_IN) of the PGA 16 of FIG. 9 and a retention node ND1. The on/off state of the switch elements 20A and 20B is controlled by signals SPLP and SPLA, respectively. The signals SPLP and SPLA are supplied from the control circuit 94 of FIG. 8.

The switch element 20C is provided between the connection node of the switch elements 20A and 20B and the ground node. The on/off state of the switch element 20C is controlled by a signal SPLTSW. The signal SPLTSW is supplied from the control circuit 94 of FIG. 8.

Each of the switches SW1 to SW6 is made by a pair of switch elements (illustrated with suffixes "_1" and "_2"). Switch elements SW1_1 to SW6_1 are provided to turn on/off connection between the bottom electrodes of the corresponding capacitive elements CC1 to CC6 and the voltage line 34 (VRT node) supplying the VRT voltage. Switch elements SW1_2 to SW6_2 are provided to turn on/off connection between the bottom electrodes of the corresponding capacitive elements CC1 to CC6 and the voltage line 35 (VRB node) supplying the VRB voltage.

The control circuits 41 to 46 are circuits for controlling switching of the switches SW1 to SW6, respectively, and included in the control logic circuit 33 of FIG. 9. The control circuits 41 to 46 have configurations similar to one another and each of the control circuits 41 to 46 includes nodes NA1 and NA2, N-channel MOS transistors TR1, TR2, and TR3, and a latch circuit LT1 made by two inverters. The MOS transistors TR2 and TR1 are coupled in series in this order between the node NA1 and the ground node, and the MOS transistor TR3 is coupled between the node NA2 and the ground node.

The logic level of the nodes NA1 and NA2 depends on the state of the latch circuit LT1. When the latch circuit LT1 is in the reset state, the node NA1 becomes the H level and the node NA2 becomes the L level. At this time, the VRT voltage is applied to the bottom electrode of corresponding one of the capacitive elements CC1 to CC6. When the latch circuit LT1 is in the set state, the node NA1 becomes the L level and the node NA2 becomes the H level. At this time, the VRB voltage is applied to the bottom electrode of corresponding one of the capacitive elements CC1 to CC6.

For the on/off control on the MOS transistor, a signal CRSRST signal is applied to the gate of the MOS transistor TR3 of each of the control circuits 41 and 42. When the signal CRSRST is asserted (becomes the H level), the MOS transistor TR3 is conducted, and the latch circuit LT1 in each of the control circuits 41 and 42 is reset.

A signal CRSRST2 is supplied to the gate of the MOS transistor TR3 of each of the control circuits 43 to 46. When the signal CRSRST2 is asserted (becomes the H level), the MOS transistor TR3 is conducted, and the latch circuit LT1 in each of the control circuits 43 to 46 is reset.

A signal CRSLATC according to the output of the comparator 30 of FIG. 9 is supplied to the gate of the MOS transistor TR1 of each of the control circuits 41 to 46. When the output of the comparator 30 is at the H level, the signal CRSLATC becomes the H level, and each of the transistors TR1 is turned on. When the output of the comparator 30 becomes the L level, the signal CRSLATC becomes the L level, and each of the transistors TR1 is turned off.

Signals SRCNT<2> to SRCNT<7> are supplied to the gates of the MOS transistors TR2 of the control circuits 41 to 46. When the signals SRCNT are asserted (become the H level) in a state where the CRSLATCC signal is in the H level, corresponding latch circuit LT1 can be switched to the set state.

FIG. 16 also illustrates inverters 81 and 82 for controlling the voltage of the voltage line 36 and switches 83 and 84. A signal RAMPR is supplied as a control signal to the switch 83 via the inverter 81, and the signal RAMPR is supplied as a control signal to the switch 84 via the inverters 81 and 82. When the signal RAMPR is asserted (becomes the H level), the switch 83 is turned off and the switch 84 is turned on, so that the VRAMP voltage is supplied to the voltage line 36. When the signal RAMPR is negated (becomes the L level), the switch 83 is turned on and the switch 84 is turned off, so that the VRB voltage is supplied to the voltage line 36.

Each of the control signals CRSRST, CRSRST2, SRCNT, and RAMPR is supplied from the control circuit 94 of FIG. 8.

Circuit for Generating Signals CMPOUT and CRSLATC

Figure 17:
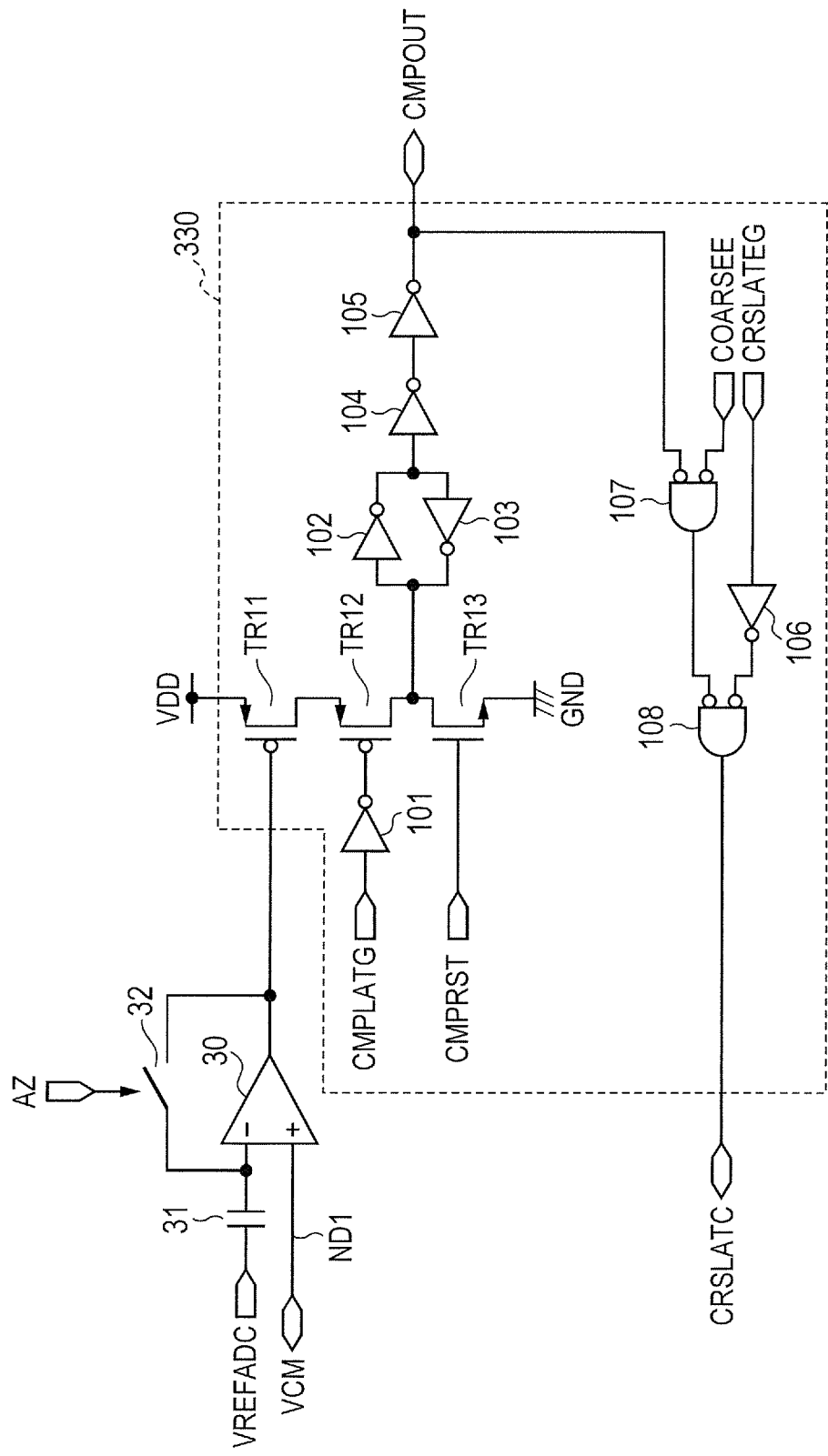
FIG. 17 is a circuit diagram for explaining a concrete configuration of a part of a control logic circuit 33 in FIG. 9.

FIG. 17 is a circuit diagram for explaining a concrete configuration of a part of the control logic circuit 33 in FIG. 9. By a circuit 330 shown in FIG. 17, signals CMPOUT and CRSLATC as comparing operation results are generated.

Referring to FIG. 17, the control logic circuit part 330 as a concrete configuration of a part of the control logic circuit 33 in FIG. 9 includes P-channel MOS transistors TR11 and TR12, an N-channel MOS transistor TR13, inverters 101 to 106, and NOR gates 107 and 108. The MOS transistors TR11, TR12, and TR13 are coupled in series in this order between the power supply node VDD and the ground node GND.

An output signal of the comparator 30 is supplied to the gate of the MOS transistor TR11. To control the AZ switch 32 for the comparator 30, the signal AZ supplied from the control circuit 94 in FIG. 8 is used.

To the gate of the MOS transistor TR12, the signal CMPLATG supplied from the control circuit 94 of FIG. 8 is applied via the inverter 101. To the gate of the MOS transistor TR13, the signal CMPRST supplied from the control circuit 94 of FIG. 8 is applied.

The output logic of the comparator 30 is output as a signal CMPOUT via the latch circuit made by the inverters 102 and 103 and the inverters 104 and 105.

The NOR gate 107 performs NOR operation using the signal CMPOUT and a signal COARSEE supplied from the control circuit 94 in FIG. 8. The NOR gate 108 performs NOR operation using an output signal of the NOR gate 107 and a signal obtained by inverting a signal CRSLATEG supplied from the control circuit 94 of FIG. 8 by the inverter 106. An output signal of the NOR gate 108 is used as the signal CRSLATC.

Capacitive Element Group 22, Switch Group 24, and the like

Figure 18:
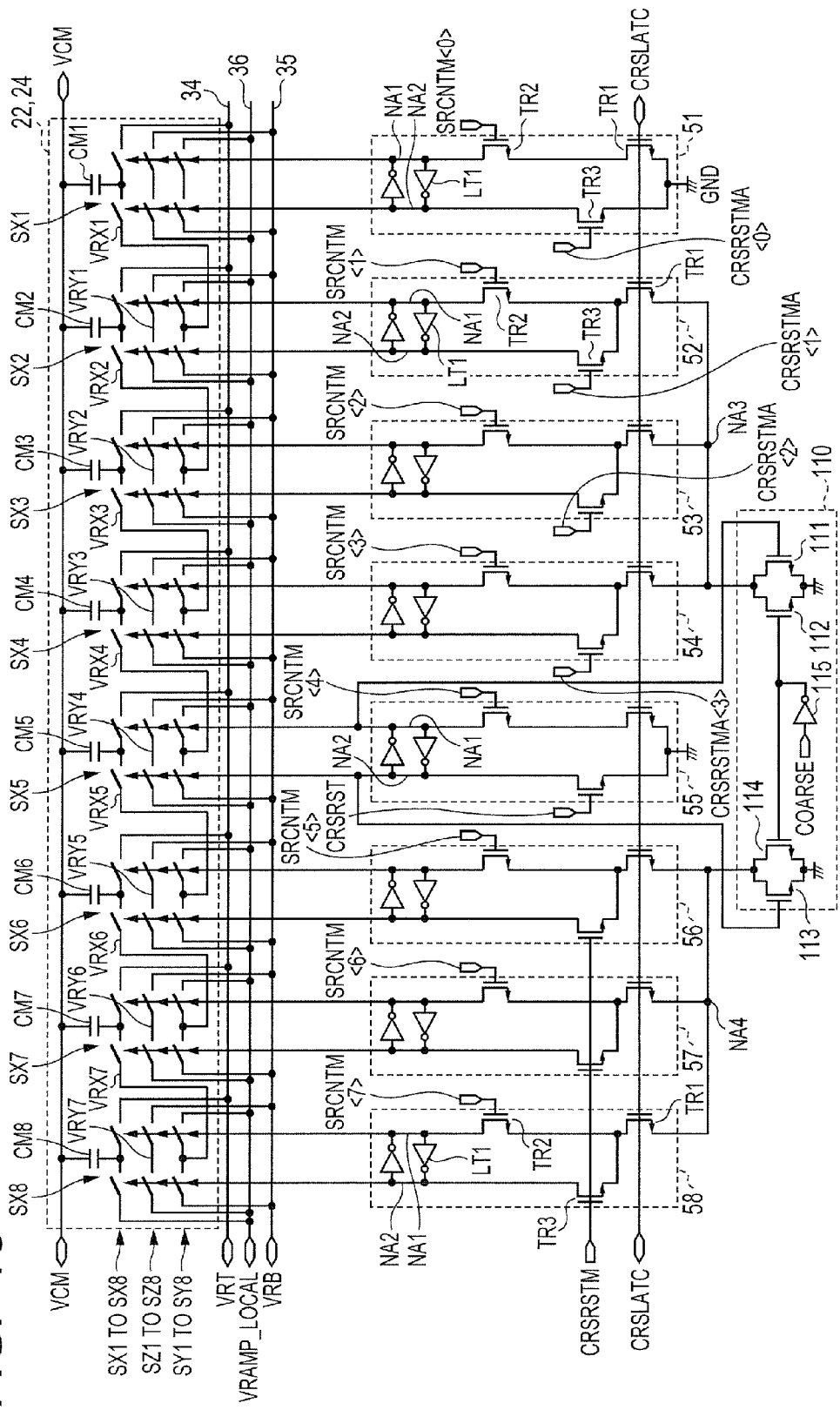
FIG. 18 is a circuit diagram showing a concrete configuration of a capacitive element group 22, a switch group 24, and control circuits 51 to 58 and 110 in FIG. 9.

FIG. 18 is a circuit diagram showing a concrete configuration of the capacitive element group 22 and the switch group 24 in FIG. 9 and control circuits 51 to 58 and 110. The control circuits 51 to 58 are provided in correspondence with the switch elements SX1 to SX8, respectively and control the switch elements SX1 to SX8, respectively.

As described with reference to FIGS. 14 and 15, the switch group 24 illustrated in FIG. 18 includes the switch elements SX1 to SX8 corresponding to the capacitive elements CM1 to CM8, switch elements SY1 to SY8 corresponding to the capacitive elements CM1 to CM8, and switch elements SZ1 to SZ8 corresponding to the capacitive elements CM1 to CM8. The switch elements SY1 to SY8 are switched interlockingly with the switch elements SX1 to SX8, and the switch elements SZ1 to SZ8 are switched interlockingly with the switch elements SX1 to SX8.

The switch elements SX1 to SX8 are used to switch the bottom electrode potentials of the corresponding capacitive elements CM1 to CM8. The switch elements SY2 to SY8 are used to switch the potentials at the corresponding nodes VRX1 to VRX7 to VRB or VRAMP. The switch elements SZ2 to SZ8 are used to switch the potentials at the corresponding nodes VRY1 to VRY7 to VRAMP or VRB. In an actual circuit layout, the nodes VRY1 to VRY7 and the nodes VRX1 to VRX7 are disposed so that the parasitic capacitance values become equal with respect to analog nodes exerting the influence on the performance of the ADC such as a VCM node (retention node ND1).

The control circuits 51 and 55 have configurations similar to each other and each of the control circuits 51 and 55 includes nodes NA1 and NA2, N-channel MOS transistors TR1, TR2, and TR3 and a latch circuit LT1 made by two inverters. The MOS transistors TR2 and TR1 are coupled in series in this order between the node NA1 and the ground node, and the MOS transistor TR3 is coupled between the node NA2 and the ground node.

The logic level of the nodes NA1 and NA2 corresponds to the state of the latch circuit LT1. When the latch circuit LT1 is in the reset state, the node NA1 becomes the H level, and the node NA2 becomes the L level. At this time, the VRT voltage is applied to the bottom electrodes of the corresponding capacitive elements CM1 and CM5. When the latch circuit LT1 is in the set state, the node NA1 becomes the L level, and the node NA2 becomes the H level. At this time, the voltage at the node VRX1 and the voltage at the node VRX5 are applied to the bottom electrodes of the corresponding capacitive elements CM1 and CM5.

The control circuit 110 includes N-channel MOS transistors 111 to 114 and an inverter 115. The MOS transistors 111 and 112 are provided in parallel to each other between the node NA3 and the ground node. The MOS transistors 113 and 114 are provided in parallel to each other between the node NA4 and the ground node. The gate of the MOS transistor 111 is coupled to the node NA1 of the control circuit 55, and the gate of the MOS transistor 113 is coupled to the node NA2 of the control circuit 55. To the gates of the MOS transistors 112 and 114, the signal COARSE supplied from the control circuit 94 in FIG. 8 is given via the inverter 115.

The control circuits 52, 53, and 54 have configurations similar to one another and each of the control circuits 52, 53, and 54 includes the nodes NA1 and NA2, the N-channel MOS transistors TR1, TR2, and TR3, and the latch circuit LT1 made by two inverters. The MOS transistors TR2 and TR1 are coupled in series in this order between the node NA1 and the node NA3. The MOS transistor TR3 is coupled between the node NA2 and the connection node of the MOS transistors TR2 and TR1.

The logic level of the nodes NA1 and NA2 corresponds to the state of the latch circuit LT1. When the latch circuit LT1 is in the reset state, the node NA1 becomes the H level and the node NA2 becomes the L level. At this time, the voltage VRT is applied to the bottom electrodes of the capacitive elements CM2, CM3, and CM4. When the latch circuit LT1 is in the set state, the node NA1 becomes the L level and the node NA2 becomes the H level. At this time, the voltages at the nodes VRX2, VRX3, and VRX4 are applied to the bottom electrodes of the corresponding capacitive elements CM2, CM3, and CM4.

The control circuits 56, 57, and 58 have configurations similar to one another and each of the control circuits 56, 57, and 58 includes the nodes NA1 and NA2, the N-channel MOS transistors TR1, TR2, and TR3, and the latch circuit LT1 made by two inverters. The MOS transistors TR2 and TR1 are coupled in series in this order between the node NA1 and the node NA4. The MOS transistor TR3 is coupled between the node NA2 and the connection node of the MOS transistors TR2 and TR1.

The logic level of the nodes NA1 and NA2 corresponds to the state of the latch circuit LT1. When the latch circuit LT1 is in the reset state, the node NA1 becomes the H level and the node NA2 becomes the L level. At this time, the voltage VRT is applied to the bottom electrodes of the corresponding capacitive elements CM6, CM7, and CM8. When the latch circuit LT1 is in the set state, the node NA1 becomes the L level and the node NA2 becomes the H level. At this time, the voltages at the nodes VRX6 and VRX7 are applied to the bottom electrodes of the corresponding capacitive elements CM6 and CM7, and the voltage of the voltage line 36 is applied to the bottom electrode of the capacitive element CM8.

The signal CRSLATC according to the output of the comparator 30 of FIG. 9 is supplied to the gate of the MOS transistor TR1 of each of the control circuits 51 to 58. In the period in which the output of the comparator 30 is at the H level and the signal CRSLATEG is at the H level, the signal CRSLATC becomes the H level, and each of the transistors TR21 is turned on. When the output of the comparator 30 becomes the L level, the signal CRSLATC becomes the L level, and each of the transistors TR1 is turned off.

Signals CRSRSTMA<0> to CRSRSTMA<3> supplied from the control circuit 94 of FIG. 8 are given to the gates of the transistors TR3 of the control circuits 51 to 54. When the signal CRSRSTMA<0> is asserted (becomes the H level), the transistor TR3 of the control circuit 51 is conducted, and the latch circuit LT1 of the control circuit 51 enters the reset state. When the corresponding signals CRSRSTMA<1> to CRSRSTMA<3> are asserted (become the H level) and the transistor 111 or 112 is in the on state, the latch circuit LT1 in each of the control circuits 52 to 54 is reset.

To the gate of the MOS transistor TR3 of the control circuit 55, the signal CRSRST supplied from the control circuit 94 of FIG. 8 is given. When the signal CRSRST is asserted (becomes the H level), the transistor TR3 of the control circuit 55 is conducted, and the latch circuit LT1 of the control circuit 55 enters the reset state.

To the gate of the MOS transistor TR3 of each of the control circuits 56 to 58, the signal CRSRSTM supplied from the control circuit 94 of FIG. 8 is given. When the signal CRSRST is asserted (becomes the H level) and the transistor 113 or 114 is in the on state, the latch circuit LT1 of each of the control circuits 56 to 58 is reset.

To the gates of the MOS transistors TR2 of the control circuits 51 to 58, signals SRCNTM<0> to SRCNTM<7> are given. When corresponding signals SRCNT<0> and SRCNTM<4> are asserted (become the H level) in a state where the signal CRSLATC is at the H level, the latch circuit LT1 of the corresponding control circuit 51 or 55 can be switched to the set state. When corresponding signals SRCNTM<1> to SRCNTM<3> are asserted (become the H level) and the transistor 111 or 112 is in the on state in a state where the signal CRSLATC is at the H level, the latch circuit LT1 of the corresponding control circuit 52, 53, or 54 can be switched to the set state. When corresponding signals SRCNTM<5> to SRCNTM<7> are asserted (become the H level) and the transistor 113 or 114 is in the on state in a state where the signal CRSLATC is at the H level, the latch circuit LT1 of the corresponding control circuit 56, 57, or 58 can be switched to the set state.

Counter in Control Circuit

Figure 19:
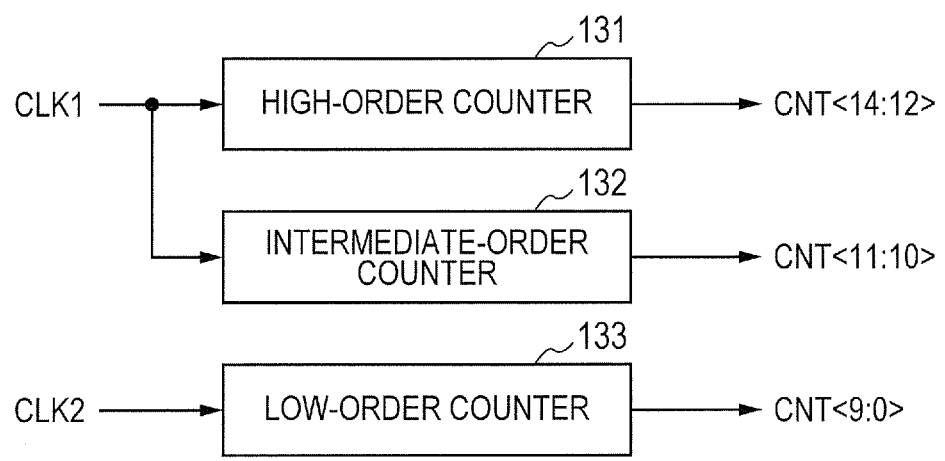
FIG. 19 is a diagram showing three counters in a control circuit 94 in FIG. 8.

FIG. 19 is a diagram showing three counters in the control circuit 94 in FIG. 8. With reference to FIG. 19, the control circuit includes a high-order counter 131, an intermediate counter 132, and a low-order counter 133.

The high-order counter 131 outputs a counter value CNT <14:12> of three bits. The high-order counter 131 updates the counter value synchronously with the clock CLK1.

The intermediate counter 132 outputs a counter value CNT <11:10> of two bits. The intermediate counter 132 updates the counter value synchronously with the clock CLK1.

The low-order counter 133 outputs a counter value CNT <9:0> of ten bits. The low-order counter 133 updates the counter value synchronously with the clock CLK2.

Digital Value Generating Circuit

Figure 20:
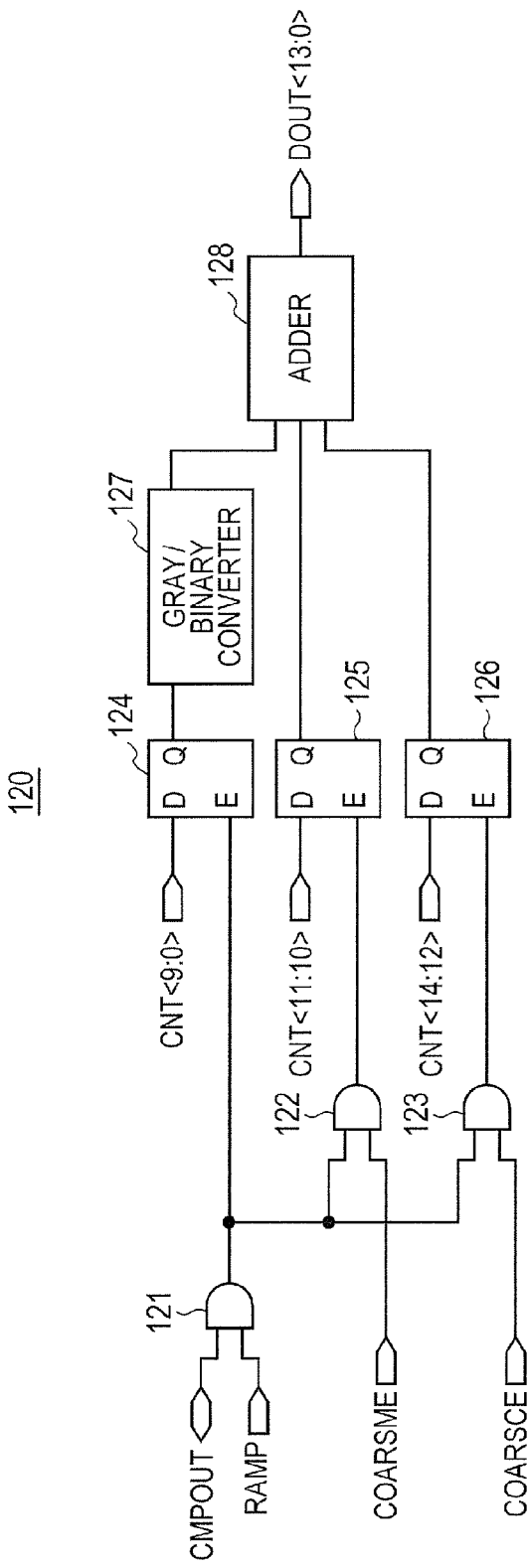
FIG. 20 is a diagram showing the configuration of a circuit 120 for generating a digital value on the basis of a CMPOUT signal as a comparison calculation result.

FIG. 20 is a diagram showing the configuration of a circuit 120 for generating a digital value on the basis of a signal CMPOUT as a comparison calculation result. A digital value DOUT <13:0> of 14 bits output from the circuit 120 of FIG. 20 is given to the H-scanner 14 in FIG. 8.

Referring to FIG. 20, the digital value generating circuit 120 includes AND gates 121, 122, and 123, flip flops 124 to 126, a gray/binary converter 127, and an adder 128.

The AND gate 121 performs AND operation using the signal CMPOUT and the signal RAMP output from the control circuit 94 in FIG. 8. The AND gate 122 performs AND operation using an output of the AND gate 121 and a signal COARSME output from the control circuit 94 in FIG. 8. The AND gate 123 performs AND operation using an output signal of the AND gate 121 and a signal COARSME signal which is output from the control circuit 94 in FIG. 8. Output signals of the AND gates 121, 122, and 123 are input to enable terminals E of flip flops 124, 125, and 126, respectively.

When the signal CMPOUT is switched from the H level to the L level in the coarse conversion period in which the signal COARSCE is asserted (becomes the H level), the flip flop 126 holds a count value of three bits output from the high-order counter 131 in the control circuit 94 of FIG. 8. The count value of three bits of the high-order counter 131 corresponds to upper three bits of a digital value obtained by AD conversion, and is a binary code.

When the signal CMPOUT is switched from the H level to the L level in the middle conversion period in which the signal COARSME is asserted (becomes the H level), the flip flop 125 holds a count value of two bits output from the intermediate-order counter 132 in the control circuit 94 in FIG. 8. The count value of two bits of the intermediate-order counter 132 corresponds to intermediate two bits of a digital value obtained by AD conversion, and is a binary code.

When the signal CMPOUT is switched from the H level to the L level in the fine conversion period in which the signal RAMP is asserted (becomes the H level), the flip flop 124 holds a count value of ten bits output from the low-order counter 133 in the control circuit 94. The count value of ten bits of the low-order counter 133 includes an over-range of one bit, corresponds to lower nine bits of a digital value obtained by AD conversion, and is a gray code. An output of the flip flop 124 is converted to a binary code by the gray/binary converter 127.

The adder 128 adds the binary code of upper three bits output from the flip flop 126, the binary code of intermediate two bits output from the flip flop 125, and the binary code of lower ten bits output from the gray/binary converter 127 and outputs the result to the H-scanner 14 in FIG. 8.

Timing Chart

Figure 21:
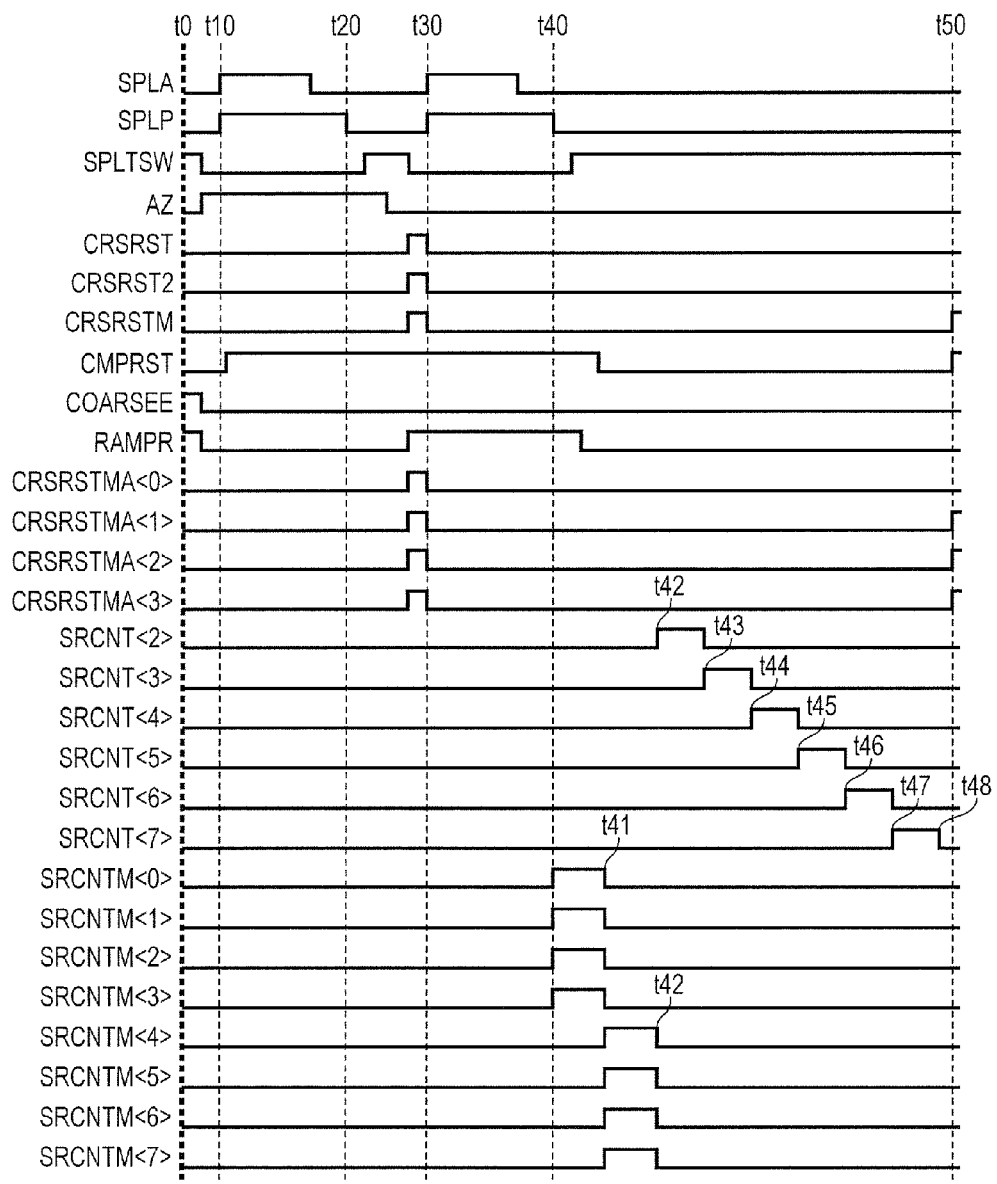
FIG. 21 is a timing chart (No. 1) showing operations of a concrete configuration example of a column ADC explained with FIGS. 16 to 20.
Figure 22:
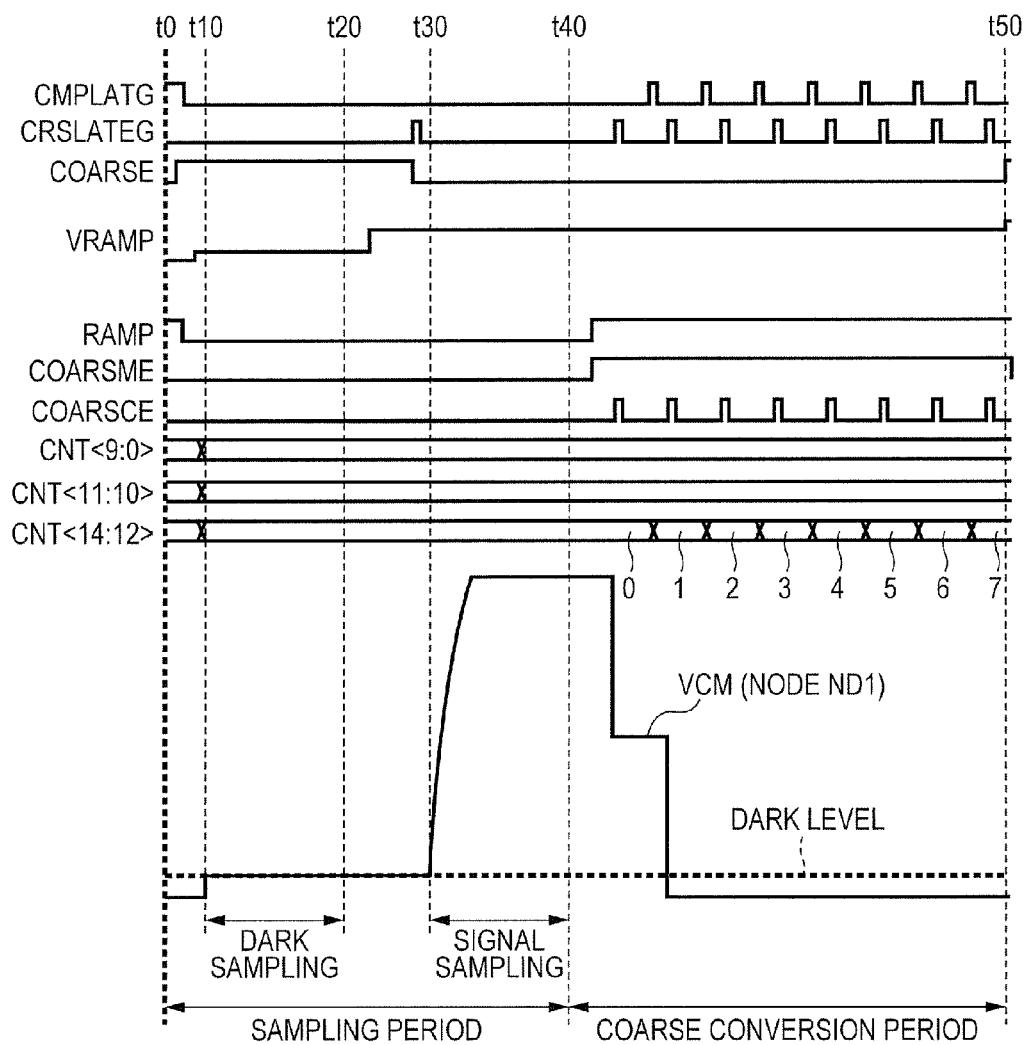
FIG. 22 is a timing chart (No. 2) showing operations of a concrete configuration example of the column ADC explained with FIGS. 16 to 20.
Figure 23:
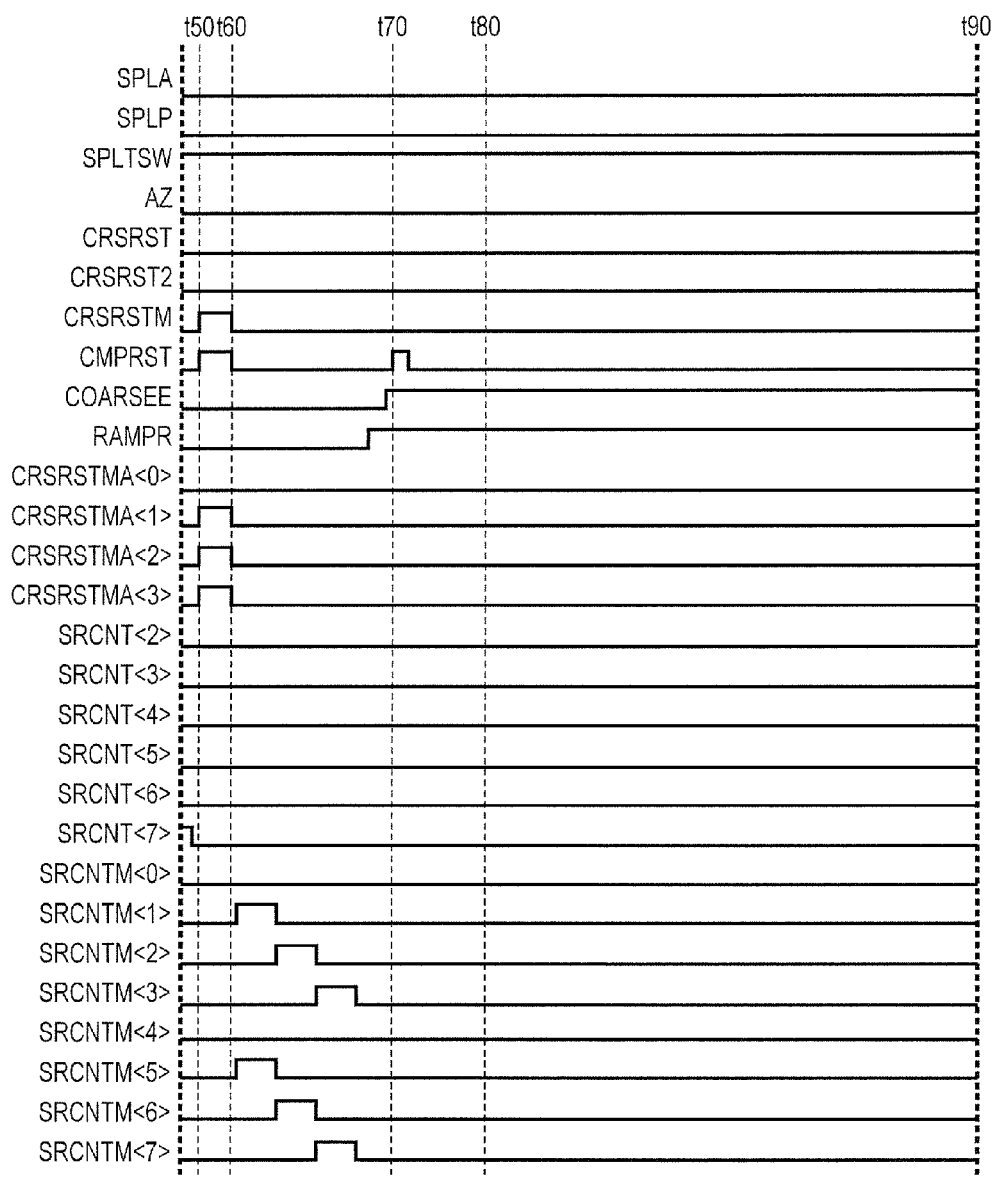
FIG. 23 is a timing chart (No. 3) showing operations of a concrete configuration example of the column ADC explained with FIGS. 16 to 20.
Figure 24:
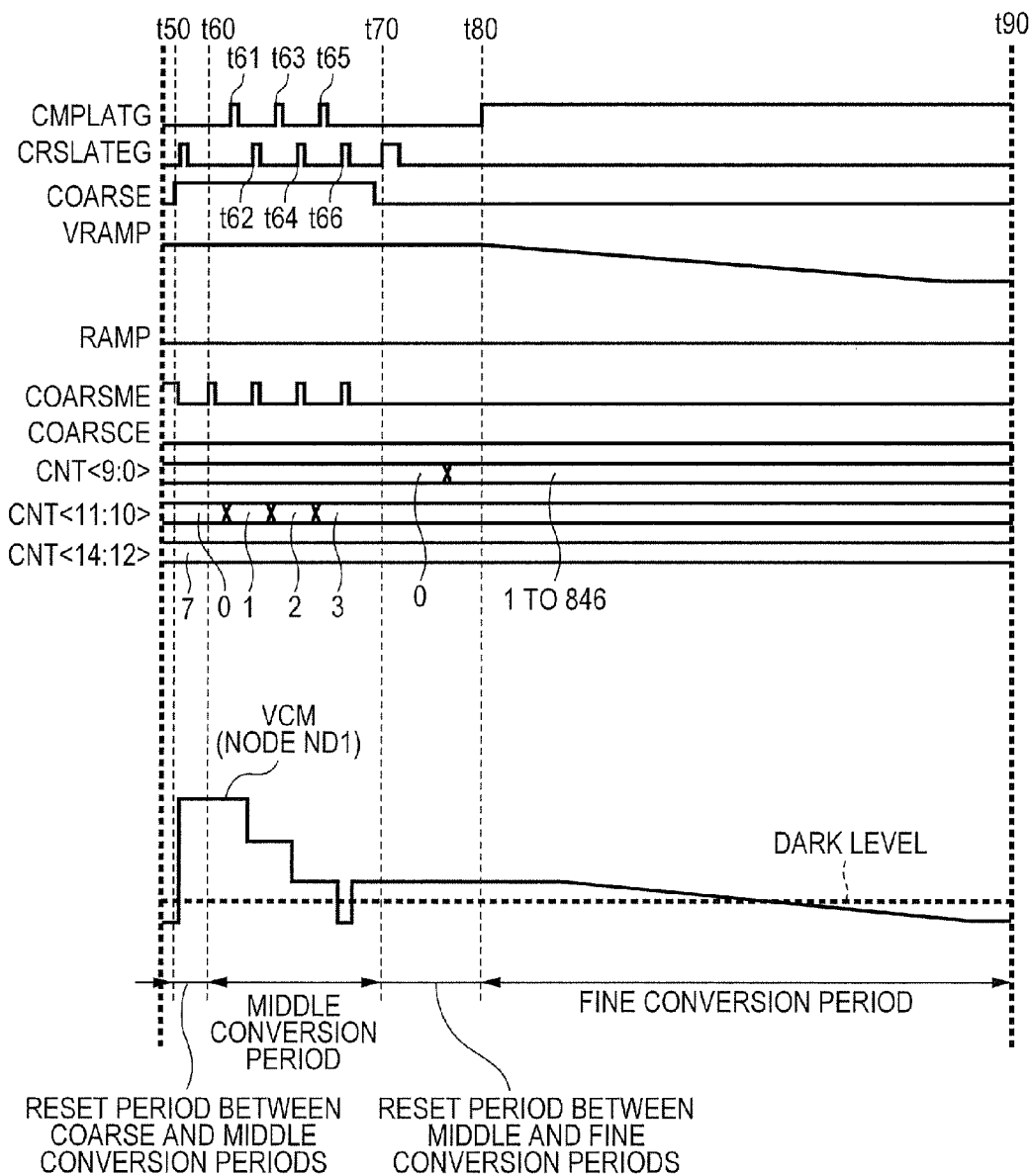
FIG. 24 is a timing chart (No. 4) showing operations of a concrete configuration example of the column ADC explained with FIGS. 16 to 20.

FIGS. 21 to 24 are timing charts showing operations of the concrete configuration examples of the column ADC described with reference to FIGS. 16 to 20. FIGS. 21 and 22 are timing charts of the sampling period and the coarse conversion period, respectively, and FIGS. 23 and 24 illustrate operations in the coarse reset period, the middle conversion period, the middle reset period, and the fine conversion period.

Referring to FIGS. 21 and 22, the period from time t0 to t40 corresponds to the sampling period, and the period from time t40 to t50 corresponds to the coarse conversion period.

First, when the signals SPLA and SPLP are asserted (become the H level) in the dark sampling period of time t10 to t20, the sampling switch 20 in FIG. 16 is turned on. Since the AZ signal is asserted (at the H level) at this time, the AZ switch 32 in the comparator 30 in FIG. 17 is turned on. Consequently, the dark level is held in the capacitive element 31 in FIG. 17. The signal SPLA is negated and then the signal AZ is negated, thereby determining the potential of the capacitive element 31 (the potential of the negative input terminal of the comparator 30).

When the signals CRSRST and CRSRST2 become the H level in the period of the following time t20 to t30, the latch circuits LT1 in the control circuits 41 to 46 in FIG. 16 are reset.

Further, by setting the signal CMPRST to the H level in this period, the transistor TR13 in FIG. 17 enters the on state, so that the signal CMPOUT becomes the H level. When the signal CRSLATEG becomes the H level in this state, the signal CRSLATC becomes the H level. Further, the signal COARSE becomes the L level and the signals CRSRSTMA<0> to CRSRSTMA<3>, the signal CRSRSTM, and the signal CRSRST become the H level, thereby resetting the latch circuits LT1 in the control circuits 51 to 58 in FIG. 18.

In the signal sampling period from the subsequent time t30 to t40, by making the signals SPLA and SPLP asserted, the sampling switch 20 in FIG. 16 is turned on. As a result, the signal voltage which is supplied in this period is held in the capacitive element groups 21 and 22 in FIGS. 16 and 18. When the signal SPLA is negated, the potentials of the capacitive element groups 21 and 22 are determined.

In the following coarse conversion period, first, in the period of time t40 to t41, the signals SRCNTM<0> to SRCNTM<3> are asserted (become the H level). When the signal CRSLATEG is asserted (becomes the H level) in this state, the latch circuits LT1 in the control circuits 51 to 54 in FIG. 18 enter the set state, and the bottom electrode potentials of the capacitive elements CM1 to CM4 are switched to VRB. As a result, the potential VCM at the retention node ND1 decreases.

In the subsequent period of time t41 to t42, the signals SRCNTM<4> to SRCNTM<7> are asserted (become the H level). First, the signal CMPLATG is asserted (becomes the H level), thereby outputting a comparison result of the comparator 30 at this time point as the signal CMPOUT (which is at the H level at this time point). Subsequently, the signal CRSLATEG is asserted (becomes the H level), so that the latch circuits LT1 of the control circuits 55 to 58 in FIG. 18 enter the set state, and the bottom electrode potentials of the capacitive elements CM5 to CM8 are switched to VRB. As a result, the potential VCM at the retention node ND1 further decreases. In the example of FIG. 22, the potential VCM at the retention node ND1 becomes lower than the dark level at this time point.

In the subsequent period of time t42 to t43, the signal SRCNT<2> is asserted (becomes the H level). The signal CMPLATG is asserted (becomes the H level) in this state, thereby outputting a comparison result of the comparator 30 at this time point as the signal CMPOUT (which is at the L level at this time point). Accordingly, the count value corresponding to the high-order level is held by the flip flop 126 in FIG. 20. Subsequently, the signal CRSLATEG is asserted (becomes the H level). However, since the signal CMPOUT is at the L level, the latch circuit in the control circuit 41 remains in the reset state. Consequently, the potential VCM at the retention node ND1 does not change.

Similarly, the signal SRCNT<3> is asserted in the period of time t43 to t44, the signal SRCNT<4> is asserted in the period of time t45 to t45, the signal SRCNT<5> is asserted in the period of time t45 to t46, the signal SRCNT<6> is asserted in the period of time t46 to t47, and the signal SRCNT<7> is asserted in the period of time t47 to t48. However, in any of the cases, the signal CMPOUT is at the L level, so that the latch circuits LT1 in the control circuits 42 to 46 remain in the reset state, and the potential VCM at the retention node ND1 does not change.

Referring to FIGS. 23 and 24, in the coarse reset period of time t50 to t60, the signal CMPRST is asserted (becomes the H level). Accordingly, the latch circuit made by the inverters 102 and 103 in FIG. 17 is reset, and the signal CMPOUT is reset to the H level.

Further, in this period, the signal CRSRSTM and the signals CRSRSTMA<1> to CRSRSTMA<3> are asserted (becomes the H level). In the case of the example, the latch circuit LT1 in the control circuit 55 of FIG. 18 is in the set state, and the node NA2 is at the H level. Therefore, the MOS transistor 111 enters the off state and the MOS transistor 113 enters the on state, so that the latch circuits LT1 in the control circuits 56 to 58 in FIG. 18 are reset. As a result, the potential VCM at the retention node ND1 increases.

In the following period of time t60 to t70, the middle conversion is executed. First, the signals SCRCNTM<1> and SCRCNTM<5> are asserted (become the H level). The signal CMPLATG is asserted (becomes the H level) at time t61 in this state, thereby outputting a comparison result of the comparator 30 at this time point as the signal CMPOUT (which is at the H level at this time point). Subsequently, the signal CRSLATEG is asserted (becomes the H level) at time t62, so that the latch circuit LT1 in the control circuit 56 in FIG. 18 enters the set state, and the bottom electrode potential of the capacitive element CM6 is switched to VRB. As a result, the potential VCM at the retention node ND1 decreases.

Subsequently, the signals SCRCNTM<2> and SCRCNTM<6> are asserted (become the H level). The signal CMPLATG is asserted (becomes the H level) at time t63 in this state, thereby outputting a comparison result of the comparator 30 at this time point as the signal CMPOUT (which is at the H level at this time point). Subsequently, the signal CRSLATEG is asserted (becomes the H level) at time t64, so that the latch circuit LT1 in the control circuit 57 in FIG. 18 enters the set state, and the bottom electrode potential of the capacitive element CM7 is switched to VRB. As a result, the potential VCM at the retention node ND1 further decreases.

The signals SCRCNTM<3> and SCRCNTM<7> are asserted (become the H level). The signal CMPLATG is asserted (becomes the H level) at time t65 in this state, thereby outputting a comparison result of the comparator 30 at this time point as the signal CMPOUT (which is at the H level at this time point). Subsequently, the signal CRSLATEG is asserted (becomes the H level) at time t66, so that the latch circuit LT1 in the control circuit 58 in FIG. 18 enters the set state, and the bottom electrode potential of the capacitive element CM8 is switched to VRB. The potential VCM at the retention node ND1 further decreases and becomes below the dark voltage level. As a result, the count value corresponding to an intermediate level is held by the flip flop 125 in FIG. 20.

In the following middle reset period of time t70 to t80, when the signal RAMPR becomes the H level, the switch 83 in FIG. 16 is turned off, and the switch 84 is turned on. Accordingly, the voltage VRAMP is supplied to the voltage line 36. The voltage VRAMP is supplied to the bottom electrode of the capacitive element CM8 via the switch element SX8 in FIG. 18. Since the value in the initial state of the voltage VRAMP is almost equal to VRT, the potential VCM at the retention node ND1 rises.

Further, in this period, the signal CMRRST is asserted (becomes the H level), so that the latch circuit configured by the inverters 102 and 103 in FIG. 17 is reset and, as a result, the signal CMPOUT returns to the H level.

In the fine conversion period of time t80 to t90, the voltage VRAMP decreases in a slop state, so that the potential VCM at the retention node ND1 gradually decreases. When the potential VCM decreases and becomes lower than the dark level, the signal CMPOUT changes to the L level. The count value at this time point is held by the flip flop 124 in FIG. 20.

Procedure of Capturing Image by Camera System

Figure 25:
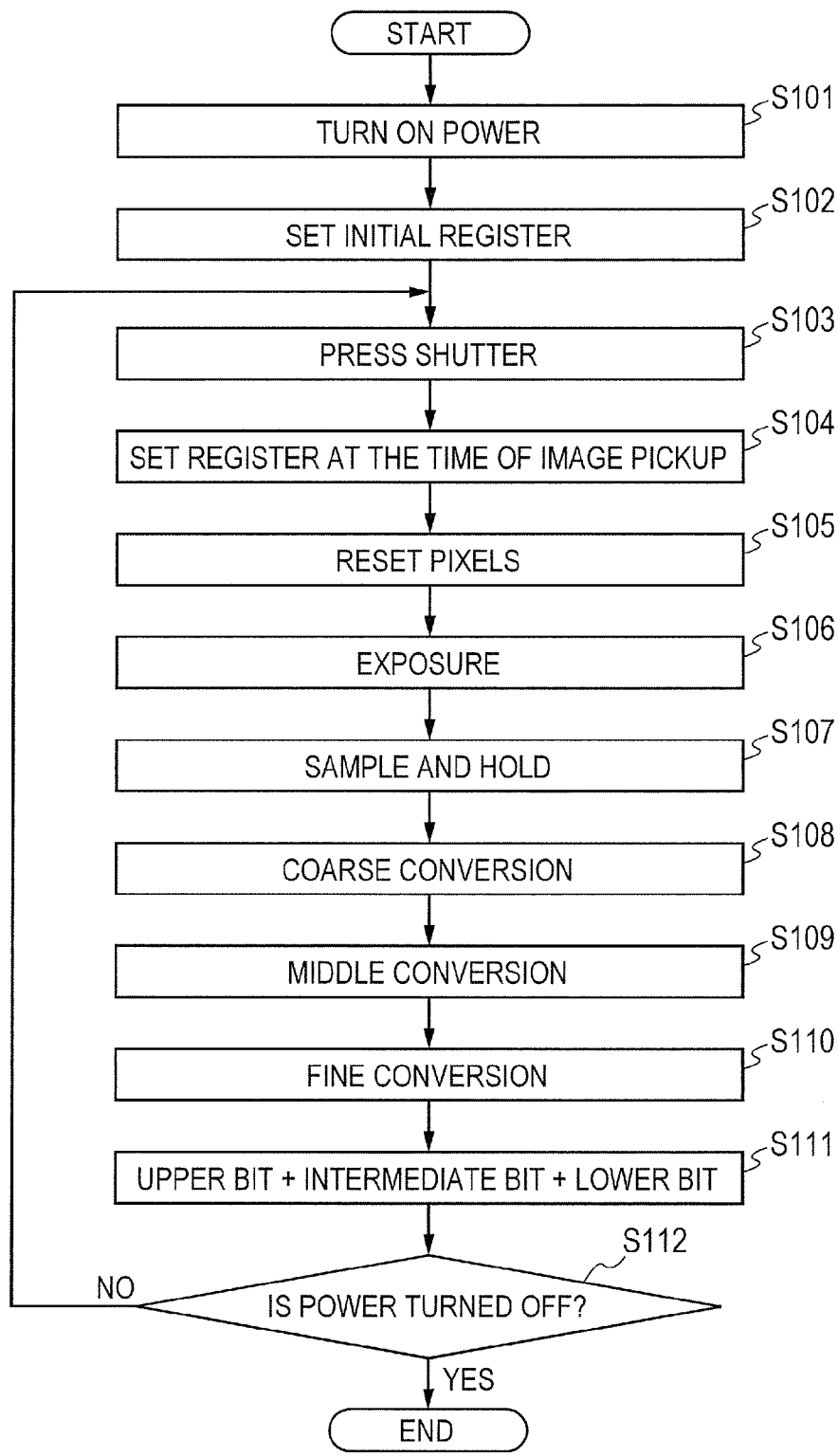
FIG. 25 is a flowchart showing an image capturing procedure by a camera system 1000 having therein the image sensor 200 of the embodiment.

FIG. 25 is a flowchart showing an image capturing procedure by the camera system 1000 having the image sensor 200 of the embodiment.

Referring to FIGS. 7 and 25, first, the power is turned on (step S101). An initial value is set in the register 66 (step S102). The user presses the shutter of the camera (step S103).

In a half press state of the shutter, the following steps S104 and S105 depending on the camera use environment are executed. Specifically, the value at the time of imaging is set in the register 766 in step S104, and pixels are reset in step S105.

Next, the pixel array (imaging part) 11 is exposed (step S106). Sampling and holding is executed (step S107). The coarse conversion is executed (step S108). The middle conversion is executed (step S109). The fine conversion is executed (step S110). The upper bit, intermediate bit, and lower bit are added (step S111).

Hereinafter, while the power of the camera system is on, each time the user presses the shutter of the camera, the process is repeated (steps S103 to S111).

Modification

Although six capacitive elements having the capacitance value 4C are provided for the coarse conversion and eight capacitive elements having the capacitance value C are provided for the middle conversion in the foregoing embodiment, the proportion of the numbers of capacitive elements may be changed. For example, seven capacitive elements having the capacitance value 4C may be provided for the coarse conversion and four capacitive elements having the capacitance value C may be provided for the middle conversion.

Although the conversion is divided to the coarse conversion, the middle conversion, and the fine conversion in the foregoing embodiment, each of the coarse conversion and the middle conversion can be further divided into multiple stages.

For example, in the case of four conversion stages, as an example, seven capacitive elements having the capacitance value 16C are provided for the first conversion stage, two capacitive elements having the capacitance value 4C are provided for the second conversion stage, and eight capacitive elements having the capacitance value C are provided for the third conversion stage. In this case, a value of three bits including the most significant bit is determined in the first conversion stage, a value of subsequent two bits is determined in the second conversion stage, a value of the subsequent two bits is determined in the third conversion stage, and a value of the remaining bits to the least significant bit is determined in the fourth conversion stage (fine conversion).

More generally, each of the column ADCs 12 converts the signal voltage held in the retention node ND1 to a digital value by executing the first to N-th conversion (N: integer of three or larger) stages in order. In the first conversion stage, the column ADC 12 compares the voltage at the retention node ND1 with reference voltage while changing the voltage by predetermined voltage steps, and determines a value of one or plural upper bits including the most significant bit of a digital value. In the i-th stage ($2 \leq i \leq N-1$), the column ADC 12 compares the voltage at the retention node ND1 with the reference voltage in a voltage step smaller than the voltage step in the (i−1)th conversion stage while changing the voltage at the retention node ND1, and determines the value of one or plural bits subsequent to the bit determined in the (i−1)th conversion stage. In the N-th conversion stage (fine conversion), the column ADC 12 compares the voltage at the retention node with the reference voltage while continuously changing the voltage in a range of the voltage step in the (N−1)th conversion stage or a range obtained by adding an overrange to the range, and determines the value of bits subsequent to the bit determined in the (N−1)th conversion stage to the least significant bit.

More concretely, each column ADC 12 includes a plurality of capacitive elements each having a top electrode coupled to the retention node ND1 and each corresponding to any one of the first to (N−1)th conversion stages. During execution of the j-th conversion stage ($1 \leq j \leq N-2$) in the first to (N−2)th conversion stages, the voltage applying unit 300 changes the voltage at the retention node ND1 by predetermined voltage steps by performing single-element switching of switching a voltage applied to the bottom electrode of the capacitive element corresponding to the j-th conversion stage element by element and/or plural-element switching of switching a voltage applied to the bottom electrode of the capacitive element corresponding to the (j+1)th to (N−1)th conversion stages by plural elements until the logic level of an output signal of the comparator 30 is inverted.

In the (N−1)th conversion stage, the voltage applying unit 300 changes the voltage at the retention node ND1 by predetermined voltage steps by performing the single-element switching of switching the voltage applied to the capacitive element corresponding to the (N−1)th conversion stage element by element until the logic level of the output signal of the comparator 30 is inverted.

In the N-th conversion stage (fine conversion), the voltage applying unit 300 changes the voltage at the retention node continuously by applying slope voltage which changes continuously to the bottom electrode of the capacitive element for which the application voltage is switched last in the (N−1)th conversion stage.

The embodiment disclosed here is to be considered as illustrative and not restrictive in all respects. The scope of the present invention is not defined by the scope of claims rather than by the above description, and equivalence of the scope of claims and all changes within the scope are intended to be embraced.

What is claimed is:

1. A solid-state image pickup device comprising:
an imaging unit in which a plurality of pixels each including a photoelectric conversion element for converting a light signal to an electric signal are disposed in a matrix, and signals of pixels in a selected row are output via a plurality of vertical read lines disposed for columns while sequentially scanning the pixels row by row; and
a plurality of converters provided in correspondence with the vertical read lines,
wherein each of the converters has a retention node for retaining a signal of a pixel which is output via a corresponding vertical read line and converts the signal retained by the retention node to a digital value by sequentially executing first to N-th (N: integer of three or larger) conversion stages,
wherein, in the first conversion stage, each of the converters determines a value of one or plural upper bits including the most significant bit of the digital value by comparing the voltage at the retention node with a reference voltage while changing the voltage at the retention node by a predetermined voltage step,
wherein, in the i-th conversion stage (2≤i≤N−1), each of the converters determines a value of one or plural bits subsequent to the bit determined in the (i−1)th stage by comparing the voltage at the retention node with the reference voltage while changing the voltage at the retention node by a voltage step smaller than the voltage step in the (i−1)th conversion stage, and
wherein, in the N-th conversion stage, each of the converters determines a value of bits subsequent to the bit determined in the (N−1)th conversion stage to the least significant bit by comparing the voltage at the retention node with the reference voltage while continuously changing the voltage at the retention node in a range of the voltage step in the (N−1)th conversion stage or a range obtained by adding an overrange to the range,
wherein each of the converters includes:
a plurality of capacitive elements each having a first electrode coupled to the retention node and each corresponding to any one of the first to (N−1)th conversion stages;
a comparator comparing the voltage at the retention node with the reference voltage; and
a voltage applying unit applying variable voltage to a second electrode of each of the capacitive elements coupled to the retention node,
wherein a plurality of capacitive elements coupled to the retention node include first to M-th (M: integer of two or larger) capacitive elements corresponding to the (N−1) conversion stage,
wherein the voltage applying unit includes:
a first power supply node to which a first voltage is applied;
a second power supply node to which a second voltage is applied;
a third power supply node which is switchably connected to one of the second voltage applied in the first to (N−1)th conversion stages, or the slope voltage which changes continuously in a first range from the first voltage to the second voltage or a second range exceeding the first range.

2. The solid-state image pickup device according to claim 1,
wherein, during execution of the j-th conversion stage (1≤j≤N−2) in the first to (N−2)th conversion stages, the voltage applying unit changes the voltage at the retention node by a predetermined voltage step by performing single-element switching of switching a voltage applied to the capacitive element corresponding to the j-th conversion stage element by element and/or plural-element switching of switching a voltage applied to the capacitive elements corresponding to the (j+1)th to (N−1)th conversion stages by plural elements until the logic level of an output signal of the comparator is inverted, and
wherein, in the (N−1)th conversion stage, the voltage applying unit changes the voltage at the retention node by a predetermined voltage step by performing the single-element switching of switching the voltage applied to the capacitive element corresponding to the (N−1)th conversion stage element by element until the logic level of the output signal of the comparator is inverted.

3. The solid-state image pickup device according to claim 2, wherein in the N-th conversion stage, the voltage applying unit continuously changes the voltage at the retention node by applying slope voltage which continuously changes to the second electrode of the capacitive element to which the application voltage is switched at the end of the (N−1)th conversion stage.

4. The solid-state image pickup device according to claim 3,
wherein the voltage applying unit includes:
first to M-th intermediate nodes provided in correspondence with the first to M-th (M: integer of two or larger) capacitive elements; first to M-th change-over switches corresponding to the first to M-th capacitive elements and also the first to M-th intermediate nodes, respectively, and each for switching a connection destination of the second electrode of a corresponding capacitive element from the first power supply node to a corresponding intermediate node; and
first to (M−1)th interlocking switches corresponding to the second to M-th change-over switches and also corresponding to the first to (M−1)th intermediate nodes, and each for switching the connection destination of a corresponding intermediate node from the third power supply node to the second power supply node interlockingly with the switching of a corresponding change-over switch, wherein, in the (N−1)th conversion stage, at least a part of the first to M-th change-over switches is sequentially switched in order from the first to the M-th number until logic level of an output signal of the comparator is inverted, and wherein, in the N-th conversion stage, the voltage of the third power supply node changes in a slope shape, and the slope voltage is applied to a second electrode of a capacitive element coupled to the change-over switch which is switched at the end of the (N−1)th conversion stage.

5. The solid-state image pickup device according to claim 2, wherein the retention node is coupled to a first input terminal of the comparator, wherein each of the converters further includes a capacitive element coupled between a second input terminal of the comparator and a ground node, and wherein the capacitive element coupled to the second input terminal of the comparator holds, as the reference voltage, a signal captured by the retention node in astute where the pixels are not irradiated with light.

6. A solid-state image pickup device comprising:

an imaging unit in which a plurality of pixels each including a photoelectric conversion element for converting a light signal to an electric signal are disposed in a matrix, and signals of pixels in a selected row are output via a plurality of vertical read lines disposed for columns while sequentially scanning the pixels row by row; and a plurality of converters provided in correspondence with the vertical read lines, wherein each of the converters has a retention node for retaining a signal of a pixel which is output via a corresponding vertical read line and converts the signal retained by the retention node to a digital value by sequentially executing first to N-th (N: integer of three or larger) conversion stages, wherein, in the first conversion stage, each of the converters determines a value of one or plural upper bits including the most significant bit of the digital value by comparing the voltage at the retention node with a reference voltage while changing the voltage at the retention node by a predetermined voltage step, wherein, in the i-th conversion stage ($2 \leq i \leq N-1$), each of the converters determines a value of one or plural bits subsequent to the bit determined in the (i−1)th stage by comparing the voltage at the retention node with the reference voltage while changing the voltage at the retention node by a voltage step smaller than the voltage step in the (i−1)th conversion stage, and wherein, in the N-th conversion stage, each of the converters determines a value of bits subsequent to the bit determined in the (N−1)th conversion stage to the least significant bit by comparing the voltage at the retention node with the reference voltage while continuously changing the voltage at the retention node in a range of the voltage step in the (N−1)th conversion stage or a range obtained by adding an overrange to the range, wherein each of the converters includes:

a plurality of capacitive elements each having a first electrode coupled to the retention node and each corresponding to any one of the first to (N−1)th conversion stages;

a comparator comparing the voltage at the retention node with the reference voltage; and a voltage applying unit applying variable voltage to a second electrode of each of the capacitive elements coupled to the retention node, wherein a plurality of capacitive elements coupled to the retention node include first to M-th (M: integer of two or larger) capacitive elements corresponding to the (N−1) conversion stage, wherein the voltage applying unit includes:

a first power supply node to which a first voltage is applied;

a second power supply node to which a second voltage is applied;

a third power supply node which is switchably connected to one of the second voltage applied in the first to (N−1)th conversion stages, or the slope voltage which changes continuously in a first range from the first voltage to the second voltage or a second range exceeding the first range;

first to M-th intermediate nodes provided in correspondence with the first to M-th (M: integer of two or larger) capacitive elements; first to M-th change-over switches corresponding to the first to M-th capacitive elements and also the first to M-th intermediate nodes, respectively, and each for switching a connection destination of the second electrode of a corresponding capacitive element from the first power supply node to a corresponding intermediate node; and first to (M−1)th interlocking switches corresponding to the second to M-th change-over switches and also corresponding to the first to (M−1)th intermediate nodes, and each for switching the connection destination of a corresponding intermediate node from the third power supply node to the second power supply node interlockingly with the switching of a corresponding change-over switch, wherein the voltage applying unit further includes:

first to (M−1)th dummy nodes disposed in positions close to the first to (M−1)th intermediate nodes, respectively; and first to (M−1)th dummy switches corresponding to the second to M-th change-over switches, respectively, and corresponding to the first to M-th dummy nodes, and each switching connection destination of a corresponding dummy node from the second power supply node to the third power supply node interlockingly with the switching of the corresponding change-over switch.

* * * * *